(12) United States Patent
Chan et al.

(10) Patent No.: US 8,650,616 B2
(45) Date of Patent: Feb. 11, 2014

(54) USER DEFINABLE POLICY FOR GRADUATED AUTHENTICATION BASED ON THE PARTIAL ORDERINGS OF PRINCIPALS

(75) Inventors: Eric S. Chan, Fremont, CA (US); Rafiul Ahad, Fremont, CA (US); Richard J. Hall, San Mateo, CA (US); Terry M. Olkin, Niwot, CO (US); Amar Padmanabha, Sunnyvale, CA (US); Padmanabha Vedam, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1334 days.

(21) Appl. No.: 11/959,038

(22) Filed: Dec. 18, 2007

(65) Prior Publication Data
US 2009/0158425 A1     Jun. 18, 2009

(51) Int. Cl.
G06F 17/30 (2006.01)
H04L 29/06 (2006.01)
G06F 21/31 (2013.01)

(52) U.S. Cl.
CPC .............. *H04L 63/08* (2013.01); *H04L 63/20* (2013.01); *G06F 21/31* (2013.01)
USPC .............. 726/4; 726/1; 726/2; 726/3; 726/27; 726/28

(58) Field of Classification Search
USPC ...................... 726/1–4, 26–30; 713/169–172
See application file for complete search history.

(56) References Cited

U.S. PATENT DOCUMENTS

| | | | | |
|---|---|---|---|---|
| 6,119,230 | A * | 9/2000 | Carter | 726/5 |
| 6,308,273 | B1 * | 10/2001 | Goertzel et al. | 726/9 |
| 6,308,274 | B1 * | 10/2001 | Swift | 726/9 |
| 6,768,988 | B2 * | 7/2004 | Boreham et al. | 707/770 |
| 7,013,485 | B2 * | 3/2006 | Brown et al. | 726/27 |
| 7,404,203 | B2 * | 7/2008 | Ng | 726/6 |
| 7,415,721 | B2 * | 8/2008 | Fransdonk | 726/4 |
| 7,428,748 | B2 * | 9/2008 | Babineau et al. | 726/5 |
| 7,587,755 | B2 * | 9/2009 | Kramer | 726/4 |
| 7,657,531 | B2 * | 2/2010 | Bisbee et al. | 726/4 |
| 7,770,214 | B2 * | 8/2010 | Lee et al. | 726/8 |
| 7,793,340 | B2 * | 9/2010 | Kiester et al. | 726/4 |
| 7,865,959 | B1 * | 1/2011 | Lewis | 726/26 |
| 8,032,922 | B2 * | 10/2011 | Bhatia et al. | 726/2 |
| 2003/0055991 | A1 * | 3/2003 | Krishnapuram et al. | 709/229 |
| 2003/0200467 | A1 * | 10/2003 | Choy et al. | 713/202 |
| 2004/0015702 | A1 * | 1/2004 | Mercredi et al. | 713/182 |
| 2004/0153675 | A1 * | 8/2004 | Dorn et al. | 713/202 |
| 2004/0268154 | A1 * | 12/2004 | Ullrich | 713/202 |
| 2006/0080316 | A1 * | 4/2006 | Gilmore et al. | 707/9 |

(Continued)

OTHER PUBLICATIONS

G. Zhang, M. Parashar: "Dynamic Context-aware Access Control for Grid Applications", Proceedings of the 4th International Workshop on Grid Computing (GRID'03), IEEE, 2003.*

*Primary Examiner* — Catherine Thiaw
(74) *Attorney, Agent, or Firm* — Shun Yao; Park, Vaughan, Fleming & Dowler LLP

(57) ABSTRACT

Apparatus, methods, and computer program products are disclosed that determine an actor context of an actor as well as an access environment for an attempted operation responsive to the actor context and a necessary condition. The method also evaluates whether the access environment satisfies the necessary condition and activates a principal responsive to the evaluation and authenticates the actor against the principal.

33 Claims, 13 Drawing Sheets

(56) References Cited

U.S. PATENT DOCUMENTS

| | | | |
|---|---|---|---|
| 2006/0080346 A1* | 4/2006 | Miller | 707/100 |
| 2006/0236369 A1* | 10/2006 | Covington et al. | 726/1 |
| 2006/0248599 A1* | 11/2006 | Sack et al. | 726/27 |
| 2007/0005961 A1* | 1/2007 | Hamblin et al. | 713/167 |
| 2007/0056034 A1* | 3/2007 | Fernstrom | 726/20 |
| 2007/0169171 A1* | 7/2007 | Kumar et al. | 726/2 |
| 2008/0034410 A1* | 2/2008 | Udupa et al. | 726/5 |
| 2008/0052755 A1* | 2/2008 | Pham et al. | 726/1 |
| 2008/0086758 A1* | 4/2008 | Chowdhury et al. | 726/2 |
| 2008/0115192 A1* | 5/2008 | Kulkarni et al. | 726/2 |
| 2008/0148351 A1* | 6/2008 | Bhatia et al. | 726/2 |
| 2008/0172715 A1* | 7/2008 | Geiger et al. | 726/1 |
| 2008/0313719 A1* | 12/2008 | Kaliski et al. | 726/5 |
| 2009/0089862 A1* | 4/2009 | Sun | 726/4 |
| 2009/0094682 A1* | 4/2009 | Sage et al. | 726/4 |

* cited by examiner

```
SufConditions =>
    ActivatingActorSufficient : boolean,
    SufficientPrincipals: {Ref<Principal>}
```

FIG. 12

```
Principal ::=DelegatedPrincipal
DelegatedPrincipal =>
    DelegatedTo       : Actor
    DelegatedRoles    : {DelegatedRole}
```

FIG. 13

```
DelegatedRole =>
    [Description]   : richtext,
    Parent          : DelegatedPrincipal,
    DelegatedScope  : Scope,
    Privileges      : {Privilege}
```

FIG. 14

```
UserContext =>
  ActivePrincipal   : Principal,
  EnabledPrincipals : {Principal}
```

FIG. 15

```
Context {Characteristic}::satisfy(
        aCharacteristic:Characteristic):boolean def:characteristics:{Characteristic}
        =self.select(
            myCharacteristic:Characteristic
            |aCharacteristic::=myCharacteristic)

body:characteristics->notEmpty()
```

FIG. 16A

```
Context Characteristic::satisfies(
    aSetOfCharacteristics:{Characteristic}):boolean def:unsatisfiedCharacteristics:{Characteristic}
        =aSetOfCharacteristics.select(
            aCharacteristic:Characteristic
            |not aCharacteristic::=self)

body:unsatisfiedCharacteristics->isEmpty()
```

FIG. 16B

```
Context Network::satisfies(aNetwork:Network):boolean
  body:self.Confidentiality.satisfies(
        aNetwork.Confidentiality)
    and self.Integrity.satisfies(aNetwork.Integrity)
    and self.Carrier.satisfies(aNetwork.Carrier)
```

FIG. 16C

```
Context
Network::satisfies(aProtection:Protection):boolean
  body:self.Confidentiality.satisfies(aProtection)
    or self.Integrity.satisfies(aProtection)
    or self.Carrier.satisfies(aProtection)
```

FIG. 16D

```
Context {Network}::satisfy(
        aProtection:Protection):boolean def:insufficientNetworks:{Network}
        =self.select(aNetwork:Network
        |not aNetwork.satisfies(aProtection))

body:insufficientNetworks->isEmpty()
```

FIG. 16E

```
Context NecessaryConditions::satisfy(
    aProtectionLevel:ProtectionLevel):boolean def:unsatisfiedProtections:{Protection}
    = aProtectionLevel.Protections
      ->select(protection:Protection
        |not self.Authentications.satisfy(protection)
        and not self.Networks.satisfy(protection)
        and not self.Clients.satisfy(protection)
        and not self.Protocols.satisfy(protection)
      )

body: unsatisfiedProtections ->isEmpty()
```

FIG. 16F

```
Context NecessaryConditions::isSatisfiedBy(
        env:Environment):boolean body:   env.Network.satisfies(self.Networks)
      and env.ClientType.satisfies(self.Clients)
      and env.Protocol.satisfies(self.Protocols)
```

FIG. 16G

USER DEFINABLE POLICY FOR GRADUATED AUTHENTICATION BASED ON THE PARTIAL ORDERINGS OF PRINCIPALS

BACKGROUND

1. Technical Field

The disclosed technology relates to controlling access to and operations on computerized artifacts.

2. Background Art

Protection of a computerized artifact requires two orthogonal services. An authentication service establishes the level-of-trust or certainty as to the identity of the actor/user and an authorization service verifies that the authenticated user is authorized to perform the requested operation on the computerized artifact. Many systems support methods for end users to administer their own authorization policies, but there does not exist any compatible technology to allow end-users to administer their own authentication policies.

Traditional security policies have engendered the concept of a firewall perimeter to separate an Enterprise Intranet from the Internet to provide security for sensitive digitally-encoded information. This concept is no longer viable for the increasingly mobile, telecommuting workforce that is empowered by the widespread use of pervasive computing devices and high-speed Internet. These traditional security measures have been limiting the user experience and reducing the productivity of the user.

A firewall is a hardware and/or software solution for enforcing security policies. A firewall can be analogized to a door lock on a perimeter door in that only authorized users with a key or access card can enter the perimeter. The authorized user has all access provided by the administrator to the protected computerized artifacts once the user is past the firewall (for example, via a virtual private network (VPN) or by physical presence within the perimeter). Outside the firewall, the authorized user has no access to the computerized artifacts that contain or generate the sensitive digitally-encoded information other than what is provided to the public.

FIG. 1 illustrates a prior art firewall protection system 100 typically used to protect computerized artifacts that reside on, or are accessed by an enterprise mainframe computer 101 or an enterprise workstation 103. The enterprise mainframe computer 101 and the enterprise workstation 103 are typically connected by an intranet 105. A trusted person 107 can operate on a computerized artifact (not shown: that may contain sensitive digitally-encoded information) using the enterprise workstation 103 or the enterprise mainframe computer 101. The fundamental assumption that justifies the firewall 111 is that each device and person within the firewall 111 (within the firewall perimeter) has a level-of-trust and is authorized for the operations that person can perform on the computerized artifact. The level-of-trust is established by the person being allowed within the building or other secure area. Nevertheless, the trusted person 107 can make a copy of the computerized artifact or of the sensitive digitally-encoded information it contains onto a personal data device 113 (for example, a flash memory device, laptop computer, cell phone etc.) while within the firewall 111 and then physically carry the personal data device 113 outside the firewall 111. Furthermore, the trusted person 107 often has access to a home workstation 115 and when at home can often obtain or operate on the computerized artifact through a firewall access 117 portal (for example by use of a VPN).

However, once a copy of the sensitive digitally-encoded information is removed from within the firewall 111 (for example, by making a copy of the sensitive digitally-encoded information on the personal data device 113 or on the home workstation 115) control of the sensitive digitally-encoded information is lost as if a firewall gap 119 existed in the firewall 111. Once control of the sensitive digitally-encoded information is lost, an un-trusted person 121 can obtain access to it directly or indirectly from the trusted person 107 (for example, through theft, accident, or other well publicized approaches, etc.).

Within the firewall 111 there are well-developed and understood processes for controlling access to sensitive digitally-encoded information by using access control policies (ACP). However, there are no corresponding processes for authenticating who should be subject to the access control policies other than by controlling access to a physical location (such as controlling access to secure areas via bio-metric, authentication, etc.) and equivalents such as VPN access. Moreover, these within-firewall processes do not control access to sensitive digitally-encoded information that is removed from within the firewall 111.

Since massive amounts of data can be stored on laptops, thumb drives, cameras and cell phones as well is on devices the size of a thumbnail, and because it is convenient to do so, sensitive digitally-encoded information is often copied and transported outside the firewall 111. This exposure makes the sensitive digitally-encoded information less secure. Traditionally, governments and businesses have attempted to control this risk via written policies and assertion of legal or employment consequences for transporting the sensitive digitally-encoded information outside the firewall 111.

However, there are many ways that even novice computer users may unintentionally transport the sensitive digitally-encoded information outside the firewall 111. For example, some operating systems will transparently make local copies of a computerized artifact containing the sensitive digitally-encoded information on a portable computer to protect against network or server disconnects. Using this capability means that a copy of all or a portion of the sensitive digitally-encoded information may reside on the computer even after access to the sensitive digitally-encoded information is complete. When the portable computer is removed from the firewall perimeter (for example, taken on a trip or to a person's home) the information is removed from within the firewall perimeter.

Unlike a physical briefcase that can be inspected for papers or materials with human-visible security markings, artifacts saved in the personal data device 113 cannot be distinguished between those that have sensitive digitally-encoded information and those that do not. Thus, no security guard can be expected to detect such threats by examining the exterior of personal data device 113, and examining the computerized artifacts stored in the personal data device 113 is impractical.

To control the risk to the sensitive digitally-encoded information governments and companies implement policies that generally impede their workers' productivity (for example by implementing policies that prohibit all personal data device 113 from crossing the firewall perimeter, policies that require that the employee only work on sensitive digitally-encoded information while at a specified computer within the firewall perimeter, etc.). These policies can increase employee dissatisfaction and can thus increase the risk to the sensitive digitally-encoded information.

Another aspect of protecting sensitive digitally-encoded information is that often the only person who knows whether the information is sensitive or not is the person working with the information. Often that person is the person who classifies the information as sensitive. A system administrator cannot determine the information's sensitivity because they do not have the understanding or the training to assess the information's sensitivity. Furthermore, situations exist where such an employee has need-to-know access to the sensitive digitally-encoded information but that employee's supervisor does not have need-to-know access to the sensitive digitally-encoded information. Thus, neither the employee's supervisor nor a system administrator can specify the level of protection needed by the sensitive digitally-encoded information. Thus, the person determining the sensitivity of the sensitive digitally-encoded information can be the person who is inconvenienced by the sensitivity rating applied to the sensitive digitally-encoded information. This situation could cause the person to under estimate the level of sensitivity. What is needed is some way to minimize the impact on the person's ease-of-use so that he/she will be motivated to appropriately protect the sensitive digitally-encoded information.

Digital Rights Management (DRM) and Application security options (such as provided by Adobe Systems Incorporated's Acrobat® products, Microsoft Corporation's Office products, and compression products such as 7-ZIP and those provided by WinZip International) provide some level of access control to computerized artifacts. However, this protection is limited to an all-or-nothing approach where, for example, once a password is used to open the computerized artifact, the computerized artifact remains open and is not responsive to changes in the user's context. In addition, the features made available after opening the computerized artifact are not dependent on the user's access environment, although it may be inappropriate if the user's access environment changes while able to access the computerized artifact. The user's access environment for example, can represent the characteristics of the client device and the networks, protocols, credentials, general environment (such as time of day, location), etc. used by or affecting the client device to allow the actor to operate on the computerized artifact.

Protection of a computerized artifact requires two orthogonal services. An authentication service establishes the level-of-trust or certainty as to the identity of the actor/user and an authorization service verifies that the authenticated user is authorized to perform the requested operation on the computerized artifact. Many authentication and authorization systems provide tools to simplify the use of these authentication and authorization services, both of which are needed to identify a user and to determine whether that user is allowed to operate on a computerized artifact. Many of these systems enable end-users to administer access control policies (commonly represented by access control lists on the computerized artifacts) which are enforced by the authorization service. Some of these systems enable system administrators to supply login modules and policies for the authentication service through deployment descriptors and/or configuration files.

The US Department of Defense's DOD-5015.2 standard for Records Management introduced the concept of supplemental markings to be part of its regular access control solutions. This standard stipulates that each record instance can be associated with supplemental markings that elaborate on or clarify document handling. The user objects can also be associated with the same set of supplemental markings. The file plan creator can specify how the supplemental markings determine whether the user can access the record, using rules such as (1) the user's markings must be a superset of the record's markings, or (2) the user's markings and record's markings must have at least one element in common. DOD-5015.2 standard stipulates that the file plan creator can specify the access control rules to be applied using the supplemental markings, but the DOD-5015.2 standard does not enumerate the choices for the markings nor the rules. The DOD-5015.2 markings are generally used to define authorization policies. DOD-5015.2 did not provide use-cases for markings to define authentication policies.

There are many known technologies to perform authentication including Basic authentication, Certificate authentication, Smart Card authentication, Password authentication, Biometrics authentication, etc. One skilled in the art will understand that existing authentication technologies include: "No authentication" where no trust is established; "Basic authentication" where the trust establishing information is sent in the clear (for example a Dual-tone multi-frequency (DTMF) key sequence or a voice PIN without end-to-end encryption support or for passwords sent on a non-SSL link); "Password authentication" where the trust establishing information is a user name and password that is obtained in a secure manner; Biometrics authentication that uses a biological characteristic of the user (such as fingerprints, signature and voice biometrics) to establish the level-of-trust; and "Certificate authentication" where the level-of-trust is established using cryptographic certificates;

Well known Password authentication technologies include Digest, Form, Kerberos, SecureID, and Radius authentications. One skilled in the art will understand these and similar technologies.

Well known Certificate authentication technologies include ClientCert, SmartCard, SIM, WIM, and SIM-WIM. One skilled in the art will understand these and similar technologies.

Confidentiality/Privacy of the computerized artifact can be established through the use of well-known encryption technology such as used to establish Secure Socket Layer (SSL) and Transport Layer Security (TLS) connections as well as VPN connections. One skilled in the art will understand that HTTPS represents the use of HTTP protocol over a SSL or TLS connection; and S-HTTP represents the end-to-end encryption support for a single HTTP request/response cycle. S/MIME, PGP, and RIM are various encryption techniques for e-mail messages. Such a one will also understand S/MIME, RSA's public key encryption technology, PGP and symmetric key encryption. Such a one will understand that TLS can be combined with the Simple Authentication and Security Layer (SASL) protocol to negotiate for a desired connection type. These technologies can also support the Integrity of the computerized artifact while in transit or when stored on a client device. Existing cryptographic technologies can also provide a nonrepudiation protection to assure that an actor cannot deny having performed an operation on the computerized artifact.

Device identification (which is not actor authentication) is the technology that enables a server to automatically identify the same client device for sessions subsequent to the first session. The Liberty Alliance Project has defined an open standard for identity federation and identity brokering protocols. This standard augments the authentication and Single Sign-On (SSO) functionality. This standard includes support for pseudonyms (which are unique and persistent within a federation) to preserve the anonymity of the users.

One skilled in the art will understand that an access control policy is a set of policy statements of the form ("Subject", "Privilege", "Object") defining the privileges that the Subject (actor/user) has to act on the object (computerized artifact). Many systems use a hierarchy of Subjects, Assigned Privileges, and Objects to more concisely specify the access control policy. It is common to use "Groups" to represent sets of Subjects, "Roles" to represent named sets of Assigned Privileges, and "containers" to represent sets of Objects. Some Role-Based Access Control systems model Role as a mapping of Subjects to Assigned Privileges, and therefore, use the Roles to represent a grouping of Subjects and Assigned Privileges.

In prior solutions, partial orderings of principals are represented by the hierarchy of roles in the role-based access control models. The role inherits the privileges from its super-roles. For example, an employee can be a super-role of the manager because manager is also an employee. The manager role inherits the privileges from the employee role. However, standard role-based access control models do not support negative privileges.

What is needed is a way to provide some discretionary and graduated control of access to computerized artifacts (in particular to computerized artifacts that contain sensitive digitally-encoded information) resulting from knowing what the access environment is between the actor and the computerized artifacts. If the access is attempted in a less protected access environment fewer operations on the computerized artifact should be allowed as compared to the operations allowed on the computerized artifact in a more protected access environment. Another long-felt need is for a user to be able to specify a detailed access profile (including access environment characteristics) that can be used to control operations on the computerized artifact instead of the course grained control provided by traditional access types and Role privileges of users within the firewall perimeter. In addition, another need is to securely protect computerized artifacts after they have been downloaded to some client device.

SUMMARY

One embodiment of the present invention provides a system that determines an actor context of an actor who is associated with multiple principals. Each principal is associated with a set of necessary conditions. The system determines an access environment for an attempted operation from the actor responsive to said actor context. The system also selects one principal associated with the actor that satisfies a protection level for the computerized artifact. The system then evaluates whether said access environment satisfies the necessary conditions associated with the selected principal. If so, the system authenticates said actor and activating the selected principal.

In a variation of the embodiment, the system further detects the attempted operation in the actor context, and authorizes the attempted operation if the access environment satisfies the necessary conditions.

In a variation of the embodiment, the system further detects a change in said access environment. The system activates a different principal in response to the change in the access environment, and attempts authorization of a second attempted operation in response to the activation of the different principal.

In a variation of the embodiment, the system further determines that a characteristic of the access environment does not satisfy the necessary conditions. The system then changes the access environment to satisfy the necessary conditions.

In a variation of the embodiment, the system further determines a sufficient condition, and activates a different principal.

In a variation of the embodiment, the system further determines a sufficient condition, and evaluating whether a sufficient group of principals have been enabled. If so, the system activates a different principal.

In a variation of the embodiment, the principal is a delegated principal.

In a variation of the embodiment, the system further specifies an assigned protection level for said computerized artifact.

In a variation of the embodiment, the system further determines a relative strength ordering for a set of available principals, whereas the set contains a stronger principal and a weaker principal. The system then grants an access type granted to the weaker principal to the stronger principal. In another variation of this embodiment, the system further denies an access type denied to the stronger principal to the weaker principal.

In variation of the embodiment, the system further uses the protected level as a constraint for Access Control List (ACL) administration. This could involve preventing assignment of a prohibited access type in response to the necessary conditions associated with the selected principal not including a protection characteristic associated with the protected level for the computerized artifact.

In a variation of the embodiment, the computerized artifact comprises one or more of a group and a role. In another variation of this embodiment, the group or the role is associated with a second type of protection level.

In a variation of the embodiment, the system further uses the second type of protected level as a constraint for Access Control List (ACL) administration. This could involve preventing assignment of a prohibited access type in response to the necessary conditions associated with member principals of the group or the role not including a protection characteristic associated with the protected level for the computerized artifact.

In a variation of the embodiment, the system further uses protected level to facilitate Access Control List (ACL) administration. The system does so by: assigning a second type of protection characteristic to a group or a role; determining whether the necessary conditions associated with the selected principal is stronger than or equal to the protection characteristic assigned to the group or the role; and if so, assigning the selected principal as a member of the group or role.

In a variation of the embodiment, a respective group comprises a plurality of subgroups, wherein the second type of protection characteristic of each subgroup is stronger than or equal to the second type of protection characteristic of the group.

BRIEF DESCRIPTION OF THE FIGURES

FIG. 12 illustrates a SufficientCondition object definition that can be used in an embodiment;

FIG. 13 illustrates a DelegatedPrincipal object definition that can be used in an embodiment;

FIG. 14 illustrates a DelegatedRole object definition that can be used in an embodiment;

FIG. 15 illustrates a UserContext object definition that can be used in an embodiment;

FIGS. 16A-G illustrate OCL-like notations for characteristics; and

DETAILED DESCRIPTION

One aspect of the disclosed technology provides individualized protection policy to a computerized artifact. One aspect of the disclosed technology includes a computerized method that determines an actor context of an actor as well as an access environment for an attempted operation responsive to the actor context and a necessary condition. The method also evaluates whether the access environment satisfies the necessary condition and activates a principal responsive to the evaluation and authenticates the actor against the principal. In addition, the disclosed technology includes apparatus that perform this method and computer products containing programs that, when executed on a computer, cause the computer to perform the method.

Thus, there is no firewall perimeter that protects the enterprise system and all the computerized artifacts contained within, but instead each of the computerized artifacts are protected by a customizable entity-specific policy that is responsive to the protection level of the computerized artifact and the access environment of the actor. This entity-specific policy can be used to effectuate an entity-specific firewall.

Figure 1:
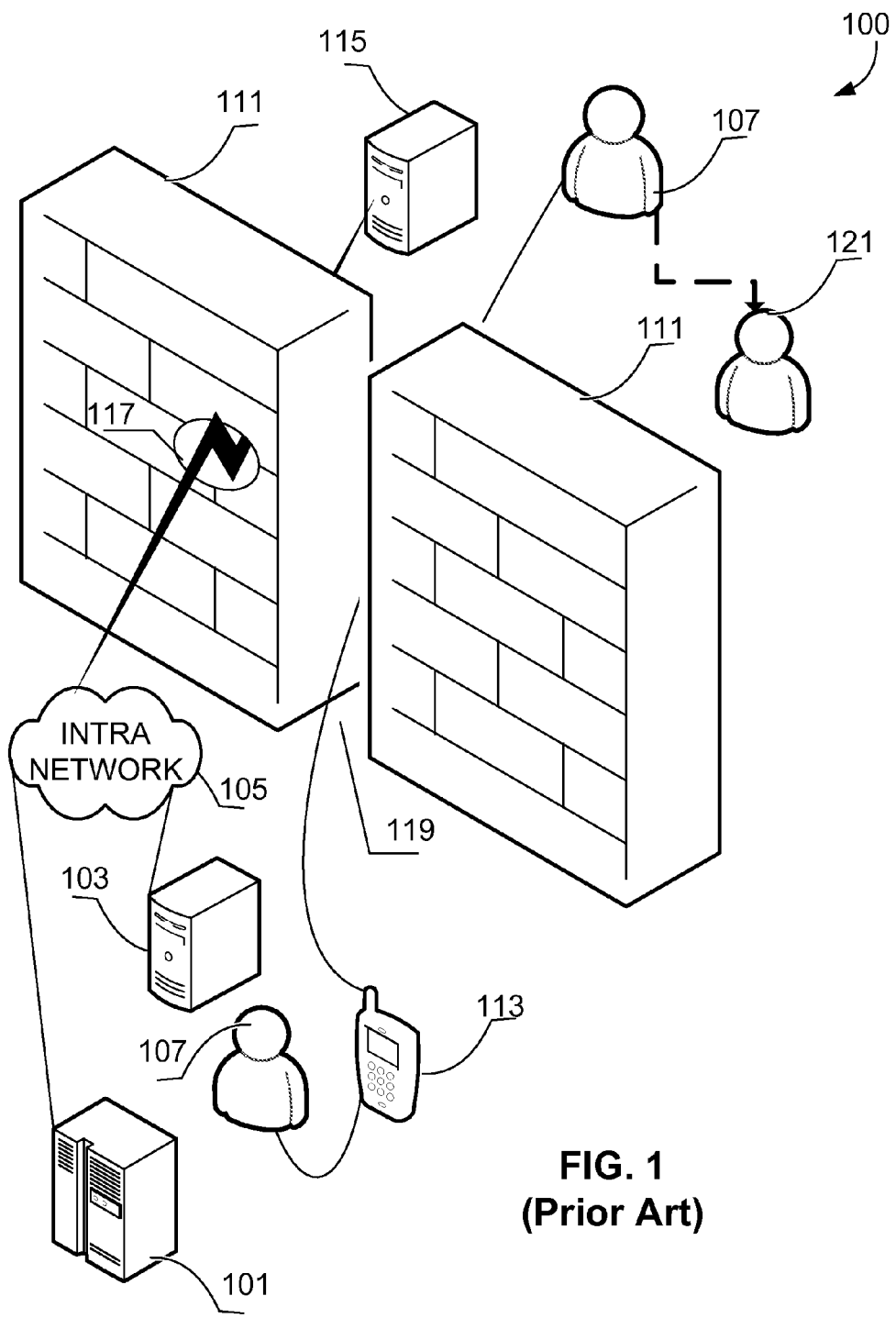
FIG. 1 illustrates a prior art firewall protection system.
Figure 2:
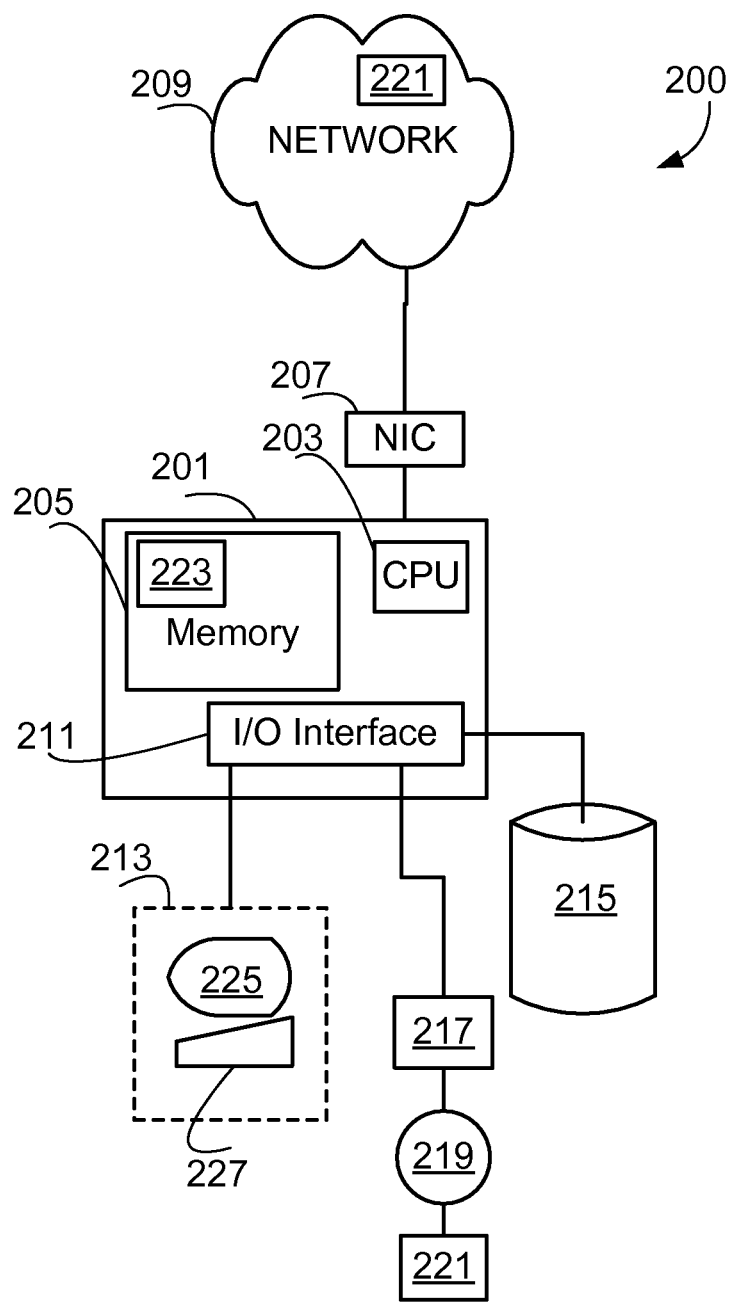
FIG. 2 illustrates a networked computer system in accordance with an embodiment.

FIG. 2 illustrates a networked computer system 200 that can incorporate an embodiment of the technology disclosed herein. The networked computer system 200 includes a computer 201 that incorporates a CPU 203, a memory 205, and a network interface 207. The network interface 207 provides the computer 201 with access to a network 209. The computer 201 also includes an I/O interface 211 that can be connected to a user interface device(s) 213, a storage system 215, and a removable data device 217. The removable data device 217 can read a computer-usable data carrier 219 (such as a fixed or replaceable ROM within the removable data device 217 itself (not shown); as well as a computer-usable data carrier that can be inserted into the removable data device 217 itself (such as a memory stick, CD, floppy, DVD or any other tangible media) that typically contains a program product 221. The user interface device(s) 213 can include a display device 225 and a user input device 227. The storage system 215 (along with the removable data device 217), the computer-usable data carrier 219, and (in some cases the network 209) comprise a file storage mechanism. The program product 221 on the computer-usable data carrier 219 is generally read into the memory 205 as a program 223 which instructs the CPU 203 to perform specified operations. In addition, the program product 221 can be provided from devices accessed using the network 209. One skilled in the art will understand that the network propagates information (such as data that defines a computer program). Signals can be propagated using electromagnetic signals, visible or invisible light pulses, signals on a data bus, or signals transmitted over any wire, wireless, or optical fiber technology that allows information to be propagated from one point to another. Programs and data are commonly read from both tangible physical media (such as those listed above) and from the network 209. Thus, the network 209, like a tangible physical media, can be a computer-usable data carrier. One skilled in the art will understand that not all of the displayed features of the computer 201 need to be present for all embodiments that implement the techniques disclosed herein. Further, one skilled in the art will understand that computers are ubiquitous within modern devices ranging from as cell phones to vehicles to kitchen appliances etc.

Figure 3:
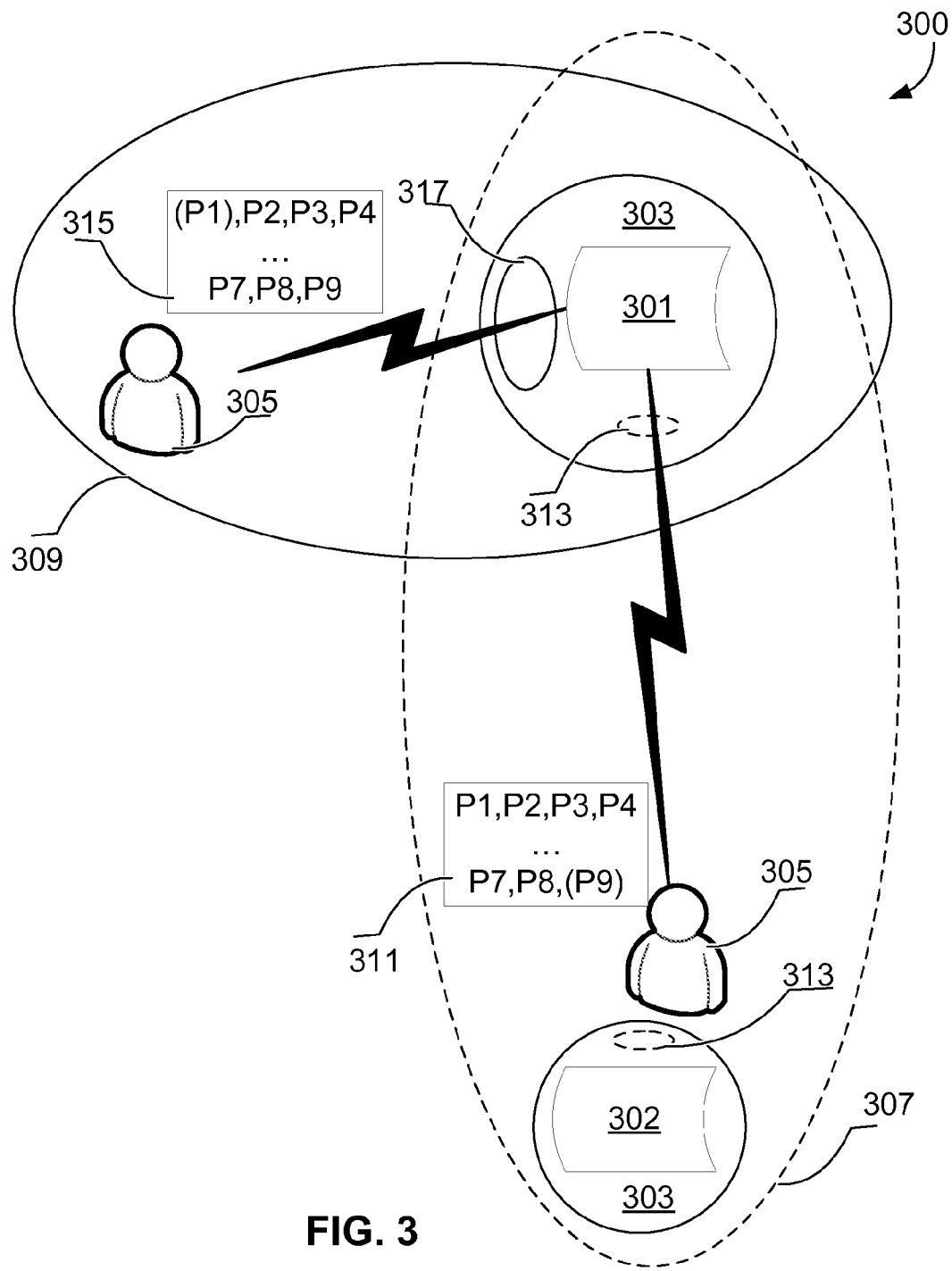
FIG. 3 illustrates the entity-specific policy concept.

FIG. 3 illustrates an entity-specific policy concept 300 for a computerized artifact 301 where an entity-specific policy 303 protects access to the computerized artifact 301 and to a copy of the computerized artifact 302. A person 305 can be within a less protected environment 307 or a more protected environment 309. The access environment can be determined from the assigned protection level of the computerized artifact and environmental characteristics such as the network, client device, location, time of day, etc. For example, when the person 305 has connected to the system using a less secure communication mechanism (such as by using an insecure communication mechanism), the person can only use certain authentication methods that allow a less permissive principal 311 to be activated to represent the person 305 while the person 305 is within the less protected environment 307. The less permissive principal 311 (P9) enables a restricted set of operations on the computerized artifact 301 as represented by a smaller access window 313 through the entity-specific policy 303. On the other hand, if the person 305 is within the more protected environment 309 such that the person 305 can authenticate his/herself to the system using a strong authentication method (for example, by knowing a previously identified client computer connected to a local network, the system can determine the authentication methods available on the client computer and challenge the user with one of the strong authentication methods) that allows a more permissive principal 315 (P1) to be activated which provides a less restricted set of operations on the computerized artifact 301 as represented by a larger access window 317 through the entity-specific policy 303. Thus, the authentication method presented to the person is graduated responsive to the characteristics of the access environment and the authorization available to the person 305 is graduated responsive to the level-of-trust resulting from the authentication of the person 305 from the users' current access environment (and that can change as the user changes their access environment). In some embodiments, the set of operations on the computerized artifact 301 can be determined by the allowed accesses to the computerized artifact 301 by the person 305 given the access types and privileges of the active principal in that person's current actor context. One skilled in the art will understand that the person 305 can be any actor on the system.

Note that if the person 305, when in the less protected environment 307 were to change the access environment (for example by disconnecting from the server to work on the copy of the computerized artifact 302 stored on a local client device), the user context (actor context) in the access environment can be changed by activating a different principal (say P4) such that operations on the computerized artifact 301 would be authorized based on P4 instead of P9.

The graduated authentication can adapt to different modes of collaboration from different client types (for example: intermittently connected clients, online web clients, clients embedded in business applications, web conferences, web services, etc.) and through different channels (such as: iCalendar, webDAV, XMPP, SIP, SMTP, IMAP, POP, etc.).

The authentication service can manually/automatically perform client device identification by utilizing the identity brokering services of wireless operators, instant messaging providers, and other network partners. By identification of the device, the authentication service can activate a client device-based principal which provides a relatively lower level-of-trust and is less permissive.

The authentication service can defer strong authentication until an operation on the computerized artifact is attempted that requires the strong authentication. Thus, for example, a weaker authentication could allow a read operation on the computerized artifact; but when a write operation is attempted that is not allowed by the weaker authentication, the system can attempt to activate a stronger authentication principal and then attempt the operation using the stronger principal. The authentication service selects a principal commensurate with the assigned protection level of the computerized artifact if such principal exists and the actor can be authenticated (or has been sufficiently authenticated by some set of enabled principals).

The selection of the principal can be responsive to the access environment (the assigned protection level and the actor context also make up the actor's access environment). In particular the selection of the principal can be responsive to the necessary conditions on the characteristics of the access environment (that is, the principal's necessary conditions are satisfied by the characteristics of the access environment). The selection can be independent of the information in the ACL of the computerized artifact. Even after the actor is authenticated to activate the selected principal, the principal may not have the access types as specified in the ACL that applies to the computerized artifact. Thus, the principal may not be authorized to perform the operation on the computerized artifact (hence the actor is not authorized to perform the operation in the actor's current access environment). This approach ensures that the graduated authentication is triggered by the higher level policy (defined in terms of the assigned protection level and on the characteristics of the actor's access environment) and not triggered by the authorization policy (defined in terms of ACL of the requested artifact or Role assignments). This approach protects the confidentiality of the ACL and Role assignments.

The actual authorization of the operation on the computerized artifact follows after authenticating the actor according to the authentication policy. Once authenticated, the authorization to perform the operation on the computerized artifact can be based on the discretionary authorization policy (which checks the individual principal against the access types on the computerized artifact). The user (an actor) has fine grained control on the access types for an individual principal as well as coarse grained control on the access types for all principals with the necessary security characteristics.

Administrators can either prohibit Password authentication from client device-based principals or allow Password authentication for these client device-based principals conditioned on whether the password authentication is performed over a sufficiently secure communication channel or by using a sufficiently trustworthy third party identity provider to establish the level-of-trust. Furthermore, instead of completely prohibiting authentication over less-secure channels, administrators can, for example, allow Personal Identification Number (PIN)-like authentication (Basic authentication) to activate the PIN principals. PIN principals or other Basic authentication principals result in a lower level-of-trust and are less permissive than a Password authentication principal. Thus, only a proper subset of the operations that the actor would be authorized to perform over a secure channel (one that establishes a high level-of-trust) are enabled over the clear channel on which only PIN can be transmitted for authentication. PIN-like authentication can be useful for voice-based clients.

Thus, for a client device-based principal, login modules or the like can use a trustworthy third party identity provider or client-management service to determine the security capability of the client device and establish the level-of-trust for that client device. The login modules can gradually authenticate the user to activate principals which satisfy the assigned protection level of the computerized artifact targeted by the actor provided the activation of the principal is permitted by the necessary condition on the characteristics of the access environment.

Figure 4:
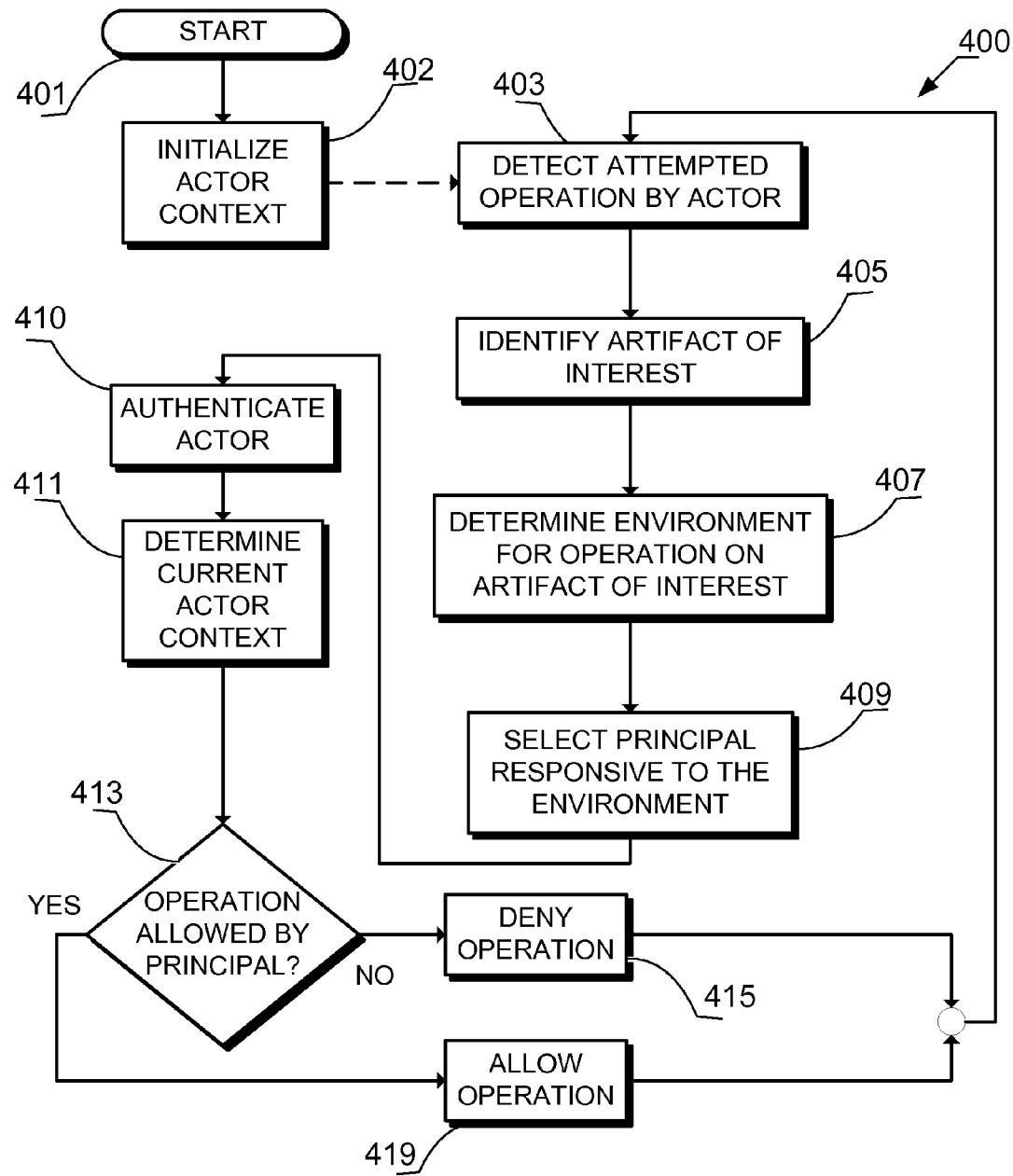
FIG. 4 illustrates an overview of one embodiment of the authentication/authorization process.

FIG. 4 illustrates an authentication/authorization process 400 that can be used to implement the concepts illustrated by FIG. 3. The authentication/authorization process 400 is initiated at a start terminal 401. The authentication/authorization process 400 can be initiated when an actor attempts to login (to authenticate the actor) to the system or when an actor attempts to access a protected computerized artifact. Once initiated, the authentication/authorization process 400 continues to a 'initialize actor context' procedure 402 that selects and activates an initial principal based on the information about the actor's pre-authentication access environment (for example, device identification and client type). The pre-authentication access environment (such as when the actor attempts to login to the system) can for example, depend on the information provided by a user's smart card when placed in the user's client device and activated. In this circumstance, the computerized artifact used in subsequent steps can be defaulted (for example, the system can supply the user's personal workspace as the computerized artifact). The principal selected by a 'principal selection' procedure 409 (subsequently described) is responsive to the activated smart card and subsequently authentication of the smart card credential occurs at an 'actor authentication' procedure 410.

Once the actor context has been initialized, the authentication/authorization process 400 continues to a 'detect attempted operation' procedure 403 that eventually detects an operation attempted by the actor on a computerized artifact, which can be identified by a 'computerized artifact identification' procedure 405. Once the computerized artifact, the operation, and the actor are identified, the authentication/authorization process 400 continues to an 'access environment determination' procedure 407 that determines the access environment for the requested operation (The access environment is subsequently described with respect to FIG. 6). Once the access environment (represented by device characteristics, network characteristics, protocol characteristics, time of day, location, etc.) is determined, the 'principal selection' procedure 409 selects one of the actor's principals that satisfies the protection level of the computerized artifact and whose necessary conditions are satisfied by the characteristics of the access environment. Next the authentication/authorization process 400 continues to the 'actor authentication' procedure 410 that authenticates the actor using any of a number of implemented authentication processes, including Basic, Password, Certificate, Biometric, etc. authentication methods, to challenge the actor for credentials corresponding to the selected principal. After the actor is authenticated within the actor's access environment, the authentication/authorization process 400 continues to a 'current actor context determination' procedure 411 that activates the authenticated principal and updates the actor's current actor context.

An 'operation authorization' decision procedure 413 uses the principal activated by the 'current actor context determination' procedure 411 to evaluate whether to authorize the operation on the computerized artifact. If the operation is not authorized, the authentication/authorization process 400 continues to a 'deny operation' procedure 415 to deny the operation and the authentication/authorization process 400 awaits the next attempted operation at the 'detect attempted operation' procedure 403.

However, if the operation is authorized at the 'operation authorization' decision procedure 413, the authentication/authorization process 400 continues to an 'allow operation' procedure 419 that allows the operation and the authentication/authorization process 400 continues to the 'detect attempted operation' procedure 403 to await the next attempted operation.

A computerized artifact is information stored on or generated by a program executing on one or more computers. For example, but without limitation, a computerized artifact can be a data base, a file, a folder, a program that generates a web page, a system maintenance program, an actor, a message, an event, a resource, etc. The computerized artifact has an assigned protection level. The assigned protection level can be specified by a system administrator, or by a user who understands the protection needed by the computerized artifact (as the computerized artifact can contain sensitive digitally-encoded information).

Thus, access through the entity-specific policy can be partially determined by the assigned protection level of the computerized artifact. The protection level is subsequently described with respect to FIG. 5A.

An actor can be a human user, administrator, a software robot (bot), a deamon, service program, etc. that can initiate an operation on the computerized artifact. A data structure that can be used to represent the actor is subsequently described with respect to FIG. 8. The actor operates within an access environment that represents the characteristics of the network, the client type of the software, the protocol, the identification of the client device, the general environment (such as time of day, location, and so forth), etc. The access environment can be considered when authenticating the actor. After the actor is authenticated, an authentication principal can be activated in the actor context. When a new authentication principal becomes active, any previous active principal becomes one of the enabled principals. Subsequently, other principals can be activated by incorporating the necessary conditions of the active principal and enabled principals in the actor context.

One aspect of the disclosed technology is the determination of an actor context. The actor context can be initialized as the actor connects to the system and can be updated after the actor is authenticated as permitted by the necessary conditions on the characteristics of the access environment. Thus, the actor context can be responsive to the actor's access environment, which can be characterized by the network, the client device (by the device's identification), the client type, and the protocol being used. The actor context is subsequently described with respect to FIG. 15.

The assigned protection level of the computerized artifact operated on by the actor can be also captured in the access environment (subsequently described with respect to FIG. 6). The current actor context can be also captured in the access environment because the enabled principals in the actor context includes the necessary conditions and the sufficient conditions that determine whether the selected principal can be activated.

Once the access environment is determined, a principal (that represents the actor to the provider of the computerized artifact) can be activated as is subsequently described with respect to FIG. 17. The assigned protection level of the computerized artifact and the access environment contains the information needed to determine which one of the actor's available principals should be activated by authentication in order to attempt authorization for the requested operation on the computerized artifact. In some embodiments the selected principal for activation can be the least permissive of the actor's available principals that satisfies the assigned protection level of the computerized artifact and that is satisfied by the necessary conditions on the characteristics of the actor's access environment.

The previously presented description conceptualizes an entity-specific policy. The entity-specific policy enables users to declare flexible, discretionary, and graduated authentication policies for operations on the computerized artifacts under the user control. The authentication policies are flexible and graduated because they can be specified by a user using 1) the full range of conditions for the protection level (that are responsive to the sensitivity of the computerized artifact), 2) the full range of necessary conditions on the characteristics of the access environment for activation of the principals, and 3) authorization policies enabling different levels of access to the protected computerized artifact (that are responsive to the level-of-trust resulting from the current actor context). The technology described herein allows an end-user and/or system administrator to have discretionary control on the authentication policy to define the entity-specific policy and allows the administrators to have control on the necessary conditions for activating the principals.

The authentication policies constrain the administration of the authorization policies used to allow the actor to operate on a computerized artifact. The technology described herein treats the authentication policies and authorization policies as two separate areas of concerns. Thus, the technology adheres to the Principle of Separation of Concerns for authentication policies and authorization policies. Furthermore, the disclosed technology ensures that the graduated authentication is triggered by the authentication policies (principals can be selected using the assigned protection level of the requested computerized artifact and the characteristics of the access environment) but not by authorization policies on the computerized artifact (the authorization policies are generally defined by access control lists on the computerized artifact or Role assignments). One result of this technology is that the authorization policies on the computerized artifact remain confidential.

The following provides details relating to one embodiment of the disclosed technology.

Figure 5A:
FIG. 5A illustrates a ProtectionLevel object definition that can be used in an embodiment.

FIG. 5A illustrates a ProtectionLevel object definition 500 that a user or system administrator can use to specify an assigned protection level on a computerized artifact. One skilled in the art will understand that the syntax of the ProtectionLevel object definition 500 (as well as that of the other object definitions) is similar to the Interface Definition Language (IDL) and such a one would be able to comprehend object definitions described using IDL. An assigned protection level can be associated with the computerized artifact by the user/owner of the computerized artifact, by the system administrator, etc.

Figure 5B:
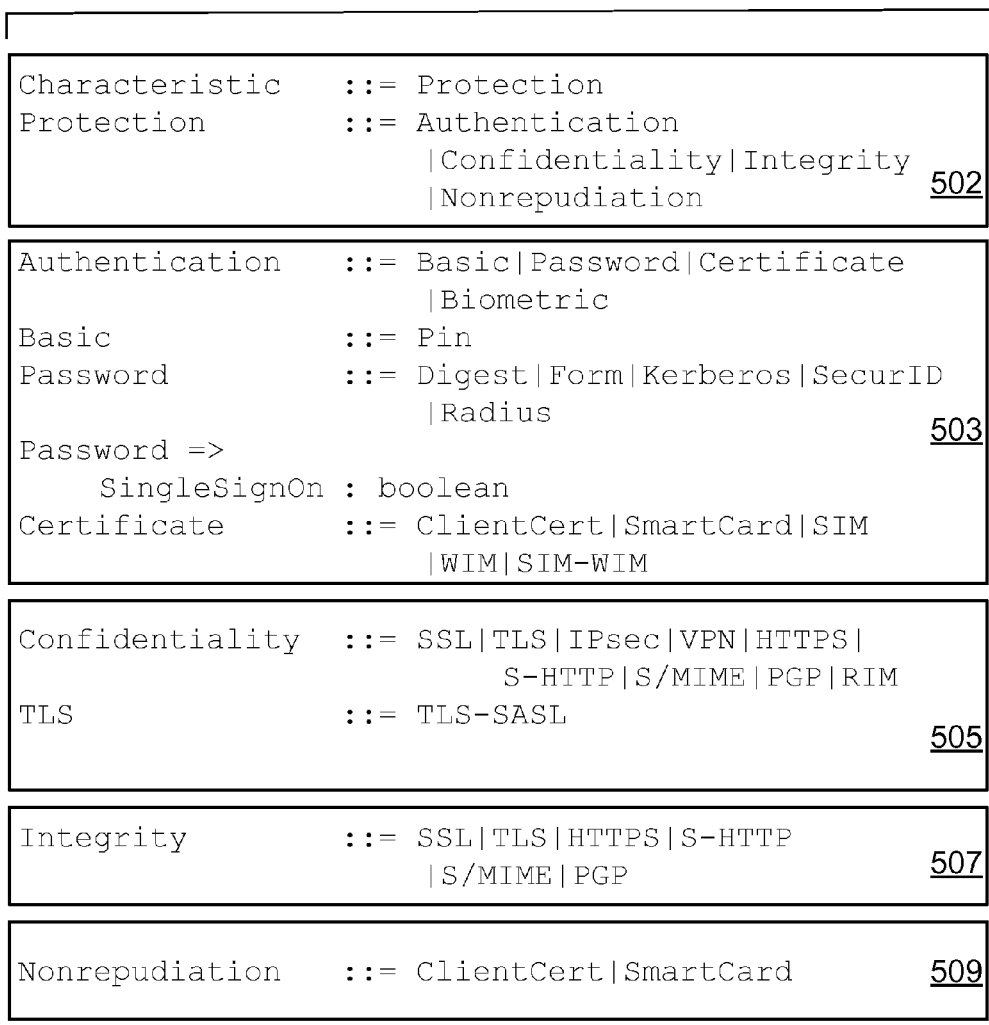
FIG. 5B illustrates characteristics that can be used with FIG. 5A

A 'protections characteristic' field 501 contains a list of protection characteristics for the computerized artifact. FIG. 5B illustrates some of the available characteristics that can be used with the ProtectionLevel object definition 500. A 'protection characteristic' field 502 can contain some grouping of Authentication, Confidentiality, Integrity, and Nonrepudiation characteristics. User or administrator actors can mark the computerized artifacts under their control with the desired protections which can carry any combination of protection characteristics. The protection characteristics specify the necessary security characteristics of the communication networks and protocols. Internet Engineering Task Force's RFC-2222 "Simple Authentication and Security Layer (SASL)" protocol can be used to negotiate for the desired type of authentication, including the client certificate based authentication, and the security supports (confidentiality and integrity) for subsequent protocol interactions.

The contents of an 'authentication characteristic' field 503 specifies what authentication is needed to establish the level-of-trust of the identity of the actor that operates on the computerized artifact. The authentication can use one or more credentials, such as pins, passwords, private keys, or distinguishing physical characteristics (biometrics) to confirm the identity of the actor. The user can specify the assigned protection level of the computerized artifact using conjunction and disjunction of authentication characteristics (for example, "{Password & Certificate}"). Such a specification requires that a principal (having necessary conditions stronger than or equal to both the password authenticated characteristic and the certificate-based authenticated characteristic) will satisfy the authentication characteristics specified in the assigned protection level of the computerized artifact. For another example, a user can specify the authentication characteristic of the assigned protection level for the computerized artifact using disjunctions of "{Basic|Password|Certificate| Biometric}" to specify that a principal whose necessary conditions are stronger than or equal to any one of the four authentication characteristics that involve some form of secret credentials belonging to the actor will match the authentication characteristic of the assigned protection level. The owner of a computerized artifact can also specify an assigned protection level to exclude the Basic authentication characteristic.

Note that in one embodiment, even though the Certificate authentication characteristic may seem stronger than Password authentication characteristic alone, the Certificate principal may not access a computerized artifact that is protected by the Password authentication characteristic unless the Certificate principal has the Password authentication characteristic as one of its necessary conditions. The owner may require both a Password authentication characteristic and Certificate authentication characteristic to require that an actor authenticate with both Password authentication and Certificate authentication. The owner can specify "Password| Certificate" to mean that either a certificate principal or a password principal can operate on the computerized artifact. In contrast, the owner can specify "Password & Certificate" to mean that both a certificate principal AND a password principal are required to operate on the computerized artifact.

In one embodiment, the Authentication characteristic can be categorically specified in an assigned protection level on the computerized artifact. Doing so imposes a constraint during access-control-list (ACL) administration that prevents assignment of prohibited access types to the client device principals whose necessary conditions do not include an Authentication characteristic. The authentication protection therefore prevents operations on these computerized artifacts from less secure clients (for example to prohibit downloading a computerized artifact onto a cell phone using an instant messenger file transfer protocol). In the expected implementations Password authentication principals would generally possess more privileges than client device principals because the Password authentication principal implies that more secure methods for authentication are used to identify the user of the client device instead of simply identifying the client device (and also that more secure networks and protocols are used to satisfy the necessary conditions to activate the password principal).

The value of a 'confidentiality characteristic' field 505, if specified, controls whether the contents or results of the computerized artifact are encrypted when transmitted or stored (for example on a client device and/or server).

The contents of an 'integrity characteristic' field 507, if specified, requires that the contents or results of the computerized artifact be unmodified while in transit between the client and the server (or while stored on a client device). One skilled in the art will understand that this protection can be supported using digitally signed message digests, or other well known cryptographic technology.

The contents of a 'nonrepudiation characteristic' field 509, if specified, requires the system to audit cryptographic receipts so that the actor cannot deny having operated on the computerized artifact from a certain access environment (for example, that the operation was initiated at 11:00 pm over an open Internet connection from a home computer).

Figure 6:
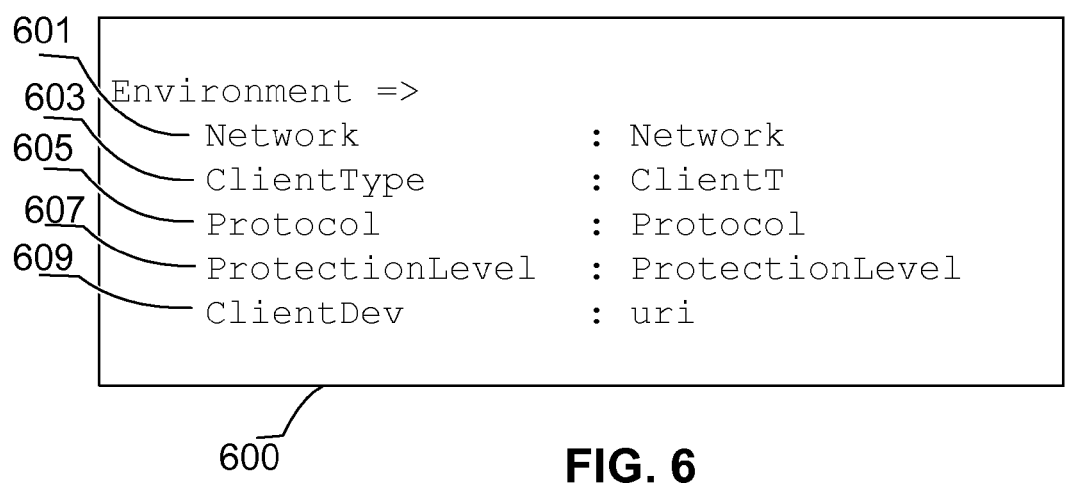
FIG. 6 illustrates an AccessEnvironment object definition that can be used in an embodiment.

FIG. 6 illustrates an AccessEnvironment object definition 600 that includes a 'network characteristic' field 601, a 'client type characteristic' field 603, a 'protocol characteristic' field 605, a 'protection level' field 607, and a 'client device identification' field 609.

The AccessEnvironment object definition 600 consolidates information needed for the system to evaluate the partial ordering process when selecting the appropriate principal to attempt the operation on the computerized artifact. The characteristics in the 'protection level' field 607 flows from the ProtectionLevel object definition 500 that a user and/or administrator has attached to the computerized artifact that is to be operated on. The 'network characteristic' field 601, the 'client type characteristic' field 603, the 'protocol characteristic' field 605 and the 'client device identification' field 609 contains information determined by the different sub-systems such as the device knowledge base, client-management service, and protocol driver. The process for selecting the principal is subsequently described with respect to FIG. 17.

Figure 7:
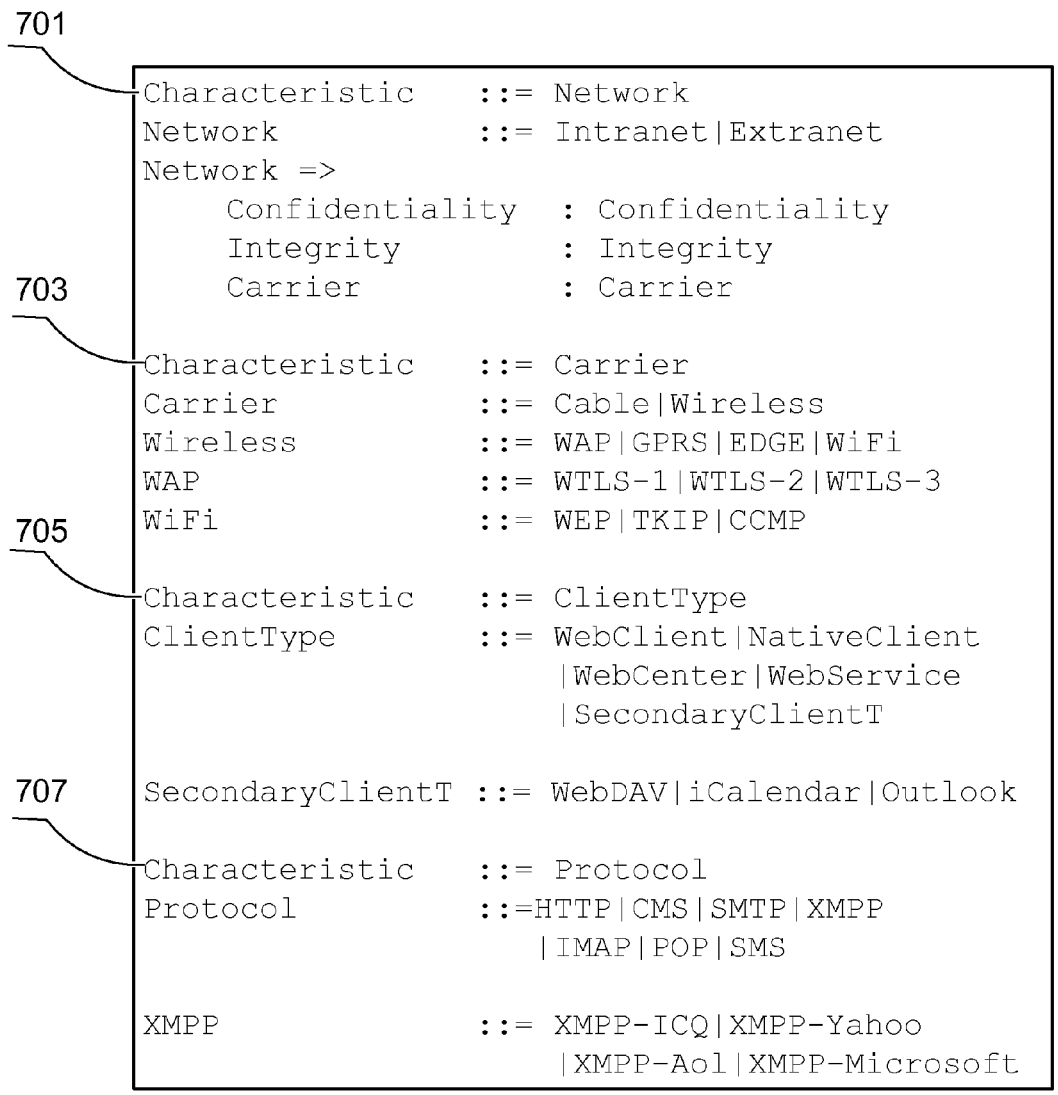
FIG. 7 illustrates characteristics related to the access environment that can be used in an embodiment.

FIG. 7 illustrates characteristics that can be related to selecting the principal to activate within an actor context. These characteristics include network characteristics 701, carrier characteristics 703, client-type characteristics 705, and protocol characteristics 707. One skilled in the art will understand the "IDL" definition for the AccessEnvironment object definition 600 and the details of these characteristics.

An actor can be any entity (including programs) that can act on the system. Each actor can own a set of principals some of which can be enabled and one of which can be activated (for example by the 'actor authentication' procedure 410) in different actor contexts. Thus, the principals represent the actor when the actor is in different access environments when attempting an operation on the computerized artifact (actor contexts are subsequently described with respect to FIG. 15). The activated principal represents the actor for subsequent authorization of the operation on the computerized artifact. To activate a principal, the actor authenticates with the necessary credentials required by the principal. Based on how the actor is authenticated, each of the available principals can become enabled. An enabled principal can correspond to one of many client device, personal identification numbers, passwords, biometrics, or certificate credentials currently and previously authenticated by the actor in establishing the actor context. When the actor attempts an operation on a computerized artifact, the disclosed technology determines or updates the actor context, the access environment, and the assigned protection level on the computerized artifact in order to select the principal whose necessary conditions are satisfied by the actor context and the characteristics of the access environment. This selected principal is activated and used for authorization of the operation on the computerized artifact.

The activated principal in the actor context depends on the characteristics of the client device, network, protocol, credential, etc. The actor context can also depend on the general environment (such as the location, time of day, etc.). The client-management system can leverage any relevant technology to provide the actors with the ability to establish or adjust the necessary client, network, and protocol characteristics in order to perform graduated authentication to achieve the desired actor context. The actor context can dynamically change depending on how the actor interacts with the device or system that provides the computerized artifact. Thus for example, the actor context dynamically changes as the actor moves from one client device to another client device or from one communication protocol to another communication protocol.

The actor context and the active principal used to authorize the requested operation can be responsive to the access environment within which the actor operates on the computerized artifact. Example access environments are represented in FIG. 3 as the less protected environment 307 and the more protected environment 309. The active principal used in the more protected environment 309 has more privileges than that of the active principal used in the less protected environment 307. The access environment can be defined by the current Network characteristic, Client type characteristic, and Protocol characteristic of the access environment. One embodiment of the access environment was previously discussed with respect to FIG. 6.

Figure 8:
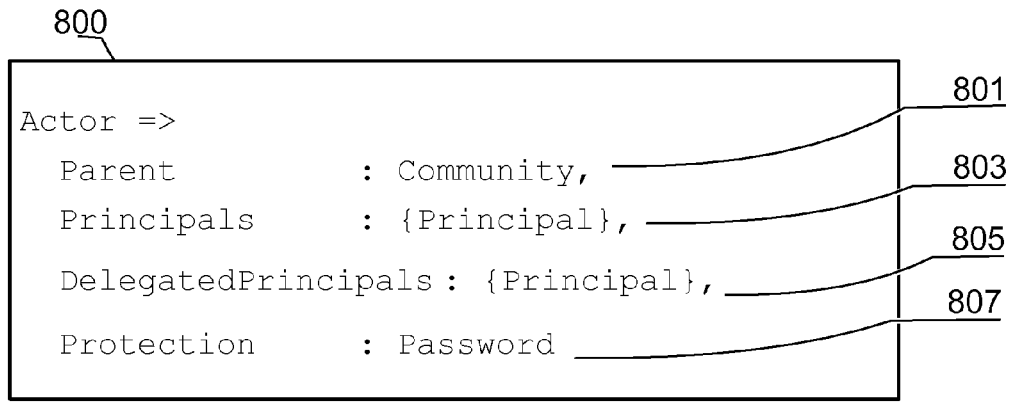
FIG. 8 illustrates an Actor object definition that can be used in an embodiment.

The actor can be represented by an Actor object definition 800 such as shown in FIG. 8 that can contain a 'parent' field 801, a 'principals' field 803, a 'delegated principals' field 805, and a 'protection' field 807. The principals owned by the actor can be referenced from the 'principals' field 803. These principals can include principals that the actor has delegated to another actor. The 'delegated principals' field 805 references principals that are not owned by the actor but instead are owned by a delegated-by actor that can be used by the actor to perform an operation on a computerized artifact in lieu of delegated-by actor. The privileges and access types of the actor are inherited by the actor's principals whose necessary conditions satisfy the protection characteristic of the actor. The 'protection' field 807, as shown in FIG. 8, specifies the protection characteristic of this actor. Some instantiations of the Actor object definition 800 may default the 'protection' field 807 to Password characteristic. The minimum protection level generally is expected to be set to an authentication characteristic, but any appropriate characteristic can be used as a value to the 'protection' field 807. The 'parent' field 801 can be used to reference a community, organization, enterprise or any other structure for which the actor is a member.

Figure 9:
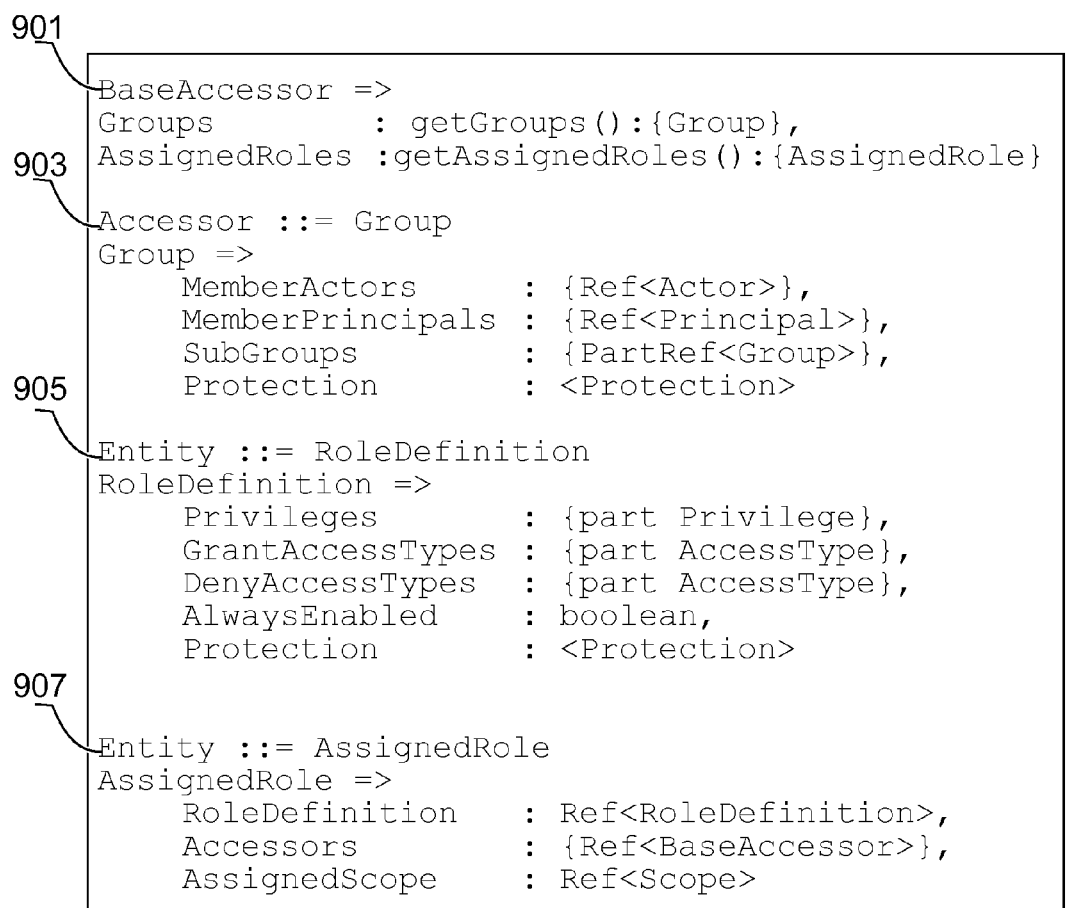
FIG. 9 illustrates an object definitions that can be used in an embodiment.

FIG. 9 illustrates object definitions 900 that includes definitions of a 'base accessor' object 901, a 'group' object 903, a 'role definition' object 905, and an 'assigned role' object 907. One skilled in the art will understand the IDL-like specification of these objects. Thus, principals can also be a member of groups and/or roles. This can be another way of granting access types and privileges to the principal. In these cases, before including the principal as a member of groups or roles, the necessary conditions of the principal should be checked against the assigned protection characteristic of the group or role. The principal should not be included in the group or role unless the necessary conditions of the principal are stronger than or equal to the assigned protection characteristics of the group or role to ensure that there is sufficient level-of-trust for the principal to inherit the privileges grantable to the group or role based on the assigned protection characteristics of the group and role. The disclosed technology involves assigning protection characteristics to the groups. A principal should not be added as a member to a group unless the necessary conditions of the principal satisfy the assigned protection characteristics of the group. Furthermore, a group should not be added as a subgroup of another group unless the assigned protection characteristics of the subgroup is stronger than or equal to the assigned protection characteristic of the super group. A group should not be a subject of an Access Control Entry on a computerized artifact unless the assigned protection characteristic of the group is stronger than or equal to the assigned protection level of the computerized artifact. Similarly protection characteristics can be assigned to the role definitions. A principal should not be assigned a role definition unless the necessary conditions of the principal satisfy the assigned protection characteristic of the role definition. Furthermore, the role definition should not be assigned to a scope unless the assigned protection characteristic for the role definition is stronger than or equal to the assigned protection characteristic of the scope. The access types of the role definition should not be applied to the computerized artifact in the assigned scope if the computerized artifact has an assigned protection level stronger than that of the role definition.

Figure 10:
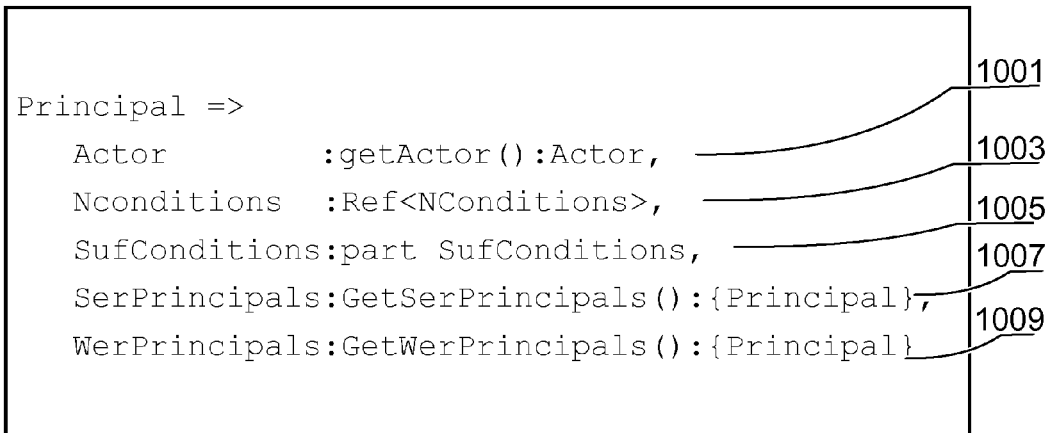
FIG. 10 illustrates a Principal object definition that can be used in an embodiment.

FIG. 10 illustrates one embodiment of a Principal object definition 1000 that can include an 'actor' field 1001, a 'necessary conditions' field 1003, a 'sufficient conditions' field 1005, a 'stronger principals' field 1007, and a 'weaker principals' field 1009. The 'actor' field 1001 references an instantiation of the Actor object definition 800 representing the actor that owns the Principal object definition 1000 (and thus the actor who owns the corresponding principal such as the actor attempting the operation, or the delegated-by actor who has delegated his/her principal to the actor attempting the operation). Before the actor attempts an operation on a computerized artifact, the actor activates one of the principals from the 'principals' field 803 or the 'delegated principals' field 805.

One type of principal represents the actor as a delegatee of another actor. That is, Actor-A can own a principal that can be delegated to actor-B. If actor-B activates the delegated principal, actor-B can perform certain operations on behalf of actor-A. For example, if actor-B sends a message or an invitation while acting under the delegated principal, actor-B can be noted or audited as the one who performed the operation, while actor-A can be identified as the sender of message or invitation. Additional details related to delegated principals are subsequently discussed with respect to FIG. 13.

The 'necessary conditions' field 1003 references characteristics that impose the minimum requirements on the credentials, network security, client, protocol, and other characteristics of the access environment that must be satisfied in order to activate this Principal object definition 1000. The Principal object definition 1000 can be categorized by a NecessaryCondition object definition 1100 as is described with respect to FIG. 11.

The 'sufficient conditions' field 1005 references sufficient conditions that enable the actor to activate a different principal without the need to perform another authentication on the different principal's credential(s)—provided the activating actor has already activated or enabled sufficient principals referenced from a 'sufficient principals' field 1203 using the corresponding credentials as is subsequently discussed with respect to FIG. 12. In some embodiments all of the sufficient principals in the 'sufficient principals' field 1203 must have been activated or enabled.

The 'stronger principals' field 1007 and the 'weaker principals' field 1009 are, or can reference, functions that compute the principals from the Actor object definition 800 that are, respectively, stronger and weaker than that represented by this instantiation of Principal object definition 1000. These functions compute the relative strengths of the principals according to the partial ordering induced by the necessary condition on the principals.

Besides partial ordering among an actor's principals, the disclosed technology can also invoke a constraint that the actor has at least Password protection level. Under such a constraint, the actor can be the subject of an Access Control Entry (ACE) on a computerized artifact only if the assigned protection level of the computerized artifact is Password authentication or weaker. The privileges and access types granted to the actor can be inherited by the actor's principals that have the necessary conditions which satisfy the Password authentication.

Figure 11:
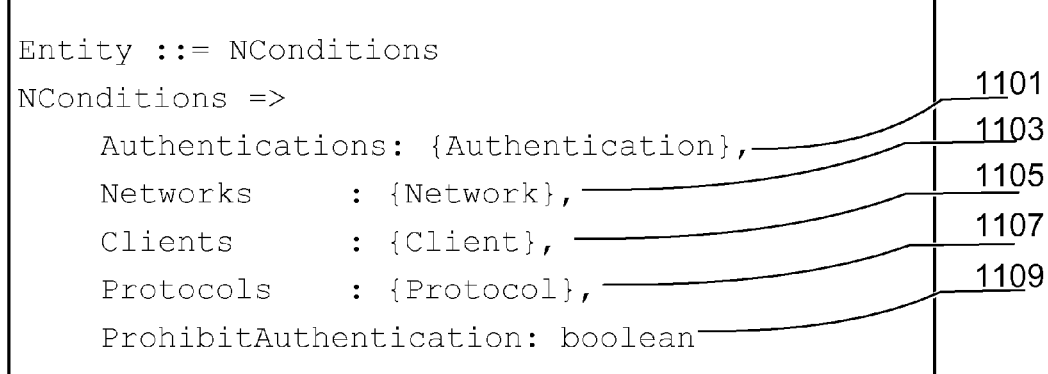
FIG. 11 illustrates a NecessaryCondition object definition that can be used in an embodiment.

FIG. 11 illustrates the NecessaryCondition object definition 1100 that can associate an 'authentications characteristics' field 1101, a 'networks characteristics' field 1103, a 'clients characteristics' field 1105, a 'protocols characteristics' field 1107, and a 'prohibit-authentication characteristic' field 1109. The NecessaryCondition object definition 1100 can be associated with the Principal object definition 1000 via the 'necessary conditions' field 1003 and can be used to categorize the principals by a set of common characteristics. The NecessaryCondition object definition 1100 specifies what access environmental characteristics are required to activate the Principal object definition 1000.

The 'authentications characteristics' field 1101 references the authentication characteristics (such as password, pin, biometric, smartcard, certificate, SSO, Kerberos, etc.) that must be satisfied to activate the Principal object definition 1000. The 'networks characteristics' field 1103 references the network security characteristics (such as SSL, HTTPS, VPN, etc.) that must be satisfied to activate the Principal object definition 1000. The 'clients characteristics' field 1105 references the client characteristics (such as Web Client, Native Client, Web Center, Web Service, etc.) that must be satisfied to activate the Principal object definition 1000. The 'protocols characteristics' field 1107 references the protocol characteristics (such as HTTP, CMS, SMTP, XMPP, IMAP, etc.) that must be satisfied to activate the Principal object definition 1000.

By defining a partial ordering of principals using the strength of the necessary conditions required to activate the principals, the disclosed technology supports graduated authentication. The partial orderings represent the necessary conditions for activation of principals in the actor context. The relative strength of the Principals can be determined by the necessary conditions on the principals. Thus, the principals can be categorized by grouping them into equivalent strength with respect to the necessary conditions on the principals and this categorization is a relative strength ordering of the principals. Two principals A and B are ordered by A>B if the necessary conditions of B are a proper subset of the necessary conditions of A. Thus, if two principals A and B are ordered by A>B, any access types for the computerized artifact granted explicitly to B are also granted implicitly to A. The partial ordering is defined to be transitive such that if there is an ordering A>B>C, then B inherits access types granted to C, and so A also inherits the access types granted to C.

The deny access types for the computerized artifact are inherited in the opposite direction. If two principals A and B are ordered by A>B, then any access types denied explicitly to A are also denied implicitly to B. The inheritance of deny access types is also defined to be transitive. If there is an ordering A>B>C, then B inherits access types denied to A, and C inherits the denied access types inherited by B from A.

We denote the necessary conditions by 4-tuples as:

<{Authentication}
{Network}
{Client}
{Protocol}> where each element in the tuple can hold a set of characteristics where the symbols "&" specifies conjunction and "|" specifies disjunction of characteristics. If A is a characteristics and B is a characteristics, then A & B is a characteristic and A|B is also a characteristic.

We derive partial ordering of the necessary conditions from the IDL subclass relations among the characteristics in FIG. 5B and FIG. 7. For example, the relation:

Authentication::=Basic|Password|Certificate|Biometric specifies that Basic, Password, Certificate, and Biometric characteristics are subclasses of the Authentication characteristic. The subclass relation is transitive; combining the above with the following relation:

Password::=Digest|Form|Kerberos|SecurID|Radius we can determine that the Digest characteristic is stronger than the Authentication characteristics: Given that principal A has the necessary conditions:

NC1 = <{Authentication}
{Network}
{Client}
{Protocol}> and given that principal B has the necessary conditions:

NC2 = <{Digest}
{Network}
{Client}
{Protocol}> the necessary conditions of principal B are stronger than the necessary conditions of principal A because principal B requires the use of Digest authentication while principal A requires any authentication (including Basic authentication). Note that because Basic and Password are subclasses of Authentication, there is no ordering between Basic and Password. The lack of ordering for some pairs of characteristics (such as, Password and Basic Authentication) is what makes the subclass relations the partial ordering relations.

Given that principal A has the necessary conditions:

<{Password & Certificate}
{Intranet | Extranet(VPN)}
{NativeClient | WebClient}
{Protocol}> and principal B has the necessary conditions:

```
<{Password}
 {Intranet | Extranet(VPN)}
 {NativeClient | WebClient}
 {Protocol}>
``` the necessary conditions of principal A are stronger than the necessary conditions of principal B because principal A requires the use of Certificate authentication as well as password authentication while principal B only requires password authentication (that is, the conditions for {Password & Certificate} authentication is stronger than {Password} authentication). Note that principal A would still be stronger than principal B if principal B defines the {Authentication} parameter as:

```
{Password|Certificate}
``` because the condition for {Password & Certificate} authentication is stronger then {Password|Certificate} authentication.

On the other hand for example, the two sets of necessary conditions:

```
<{ }
 {Intranet | Extranet(VPN)}
 {NativeClient}
 {Protocol}>
  and
 <{ }
 {Intranet | Extranet(VPN)}
 {WebClient}
 {Protocol}>
``` are not ordered. The first set of necessary conditions allows the principals of the associated category to be activated by native clients from the Intranet or from the Extranet with VPN; for any protocol. The second set of necessary conditions allows principals having these necessary conditions to be activated by web clients from the Intranet or from the Extranet with VPN; for any protocol. However, there is no ordering between WebClient and NativeClient, which are both subclasses of ClientType.

Given that principal A has the necessary conditions:

```
<{Password & Certificate}
 {Intranet | Extranet(VPN)}
 {NativeClient}
 {CMS}>
``` and principal B has the necessary conditions:

```
<{Authentication}
 {Intranet | Extranet}
 {NativeClient | WebClient}
 {Protocol}>
``` the necessary conditions of principal A are stronger than the necessary conditions of principal B because each of the authentication, network, client, and protocol characteristics in the 4-tuple of the necessary conditions for principal A is stronger than the corresponding characteristic in the necessary conditions of principal B, i.e. {Password & Certificate} is stronger than {Authentication}, {Intranet|Extranet (VPN)} is stronger than {Intranet|Extranet}, {NativeClient} is stronger than {NativeClient|WebClient}, and {CMS} is stronger than {Protocol}. One skilled in the art would understand these ordering from the subclass relations in FIG. 5A and FIG. 7.

Given that principal A has the necessary conditions:

```
<{Password & Certificate}
 {Intranet}
 {NativeClient | WebClient}
 {Protocol}>
``` and principal B has the necessary conditions:

```
<{Authentication}
 {Intranet}
 {NativeClient | WebClient}
 {CMS | HTTP}>
``` there is no ordering of the necessary conditions of principal A against necessary conditions of principal B, although principal A's authentication characteristics {Password & Certificate} is stronger than principal B's authentication characteristics {Authentication}, in reverse principal B's protocol characteristics {CMS|HTTP} is stronger than principal A's the protocol characteristics {Protocol}.

FIG. 12 illustrates a SufficientCondition object definition 1200 that can associate an 'activating actor sufficient' field 1201, and the 'sufficient principals' field 1203. The content of the 'activating actor sufficient' field 1201 represents a sufficiency condition. For example, if the 'activating actor sufficient' field 1201 of the Principal object definition 1000 is true, the Principal object definition 1000 can be activated as long as any of the principals for the activating actor have already been activated.

However, if the sufficiency condition is not satisfied (for example, the 'activating actor sufficient' field 1201 of the Principal object definition 1000 contains a false value) the activating actor can activate the Principal object definition 1000 without performing an additional authentication only if principals are referenced by the 'sufficient principals' field 1203 and, in one embodiment, the actor has activated all of them. In this embodiment in order for the Principal object definition 1000 to be activated without further authentication, the SufficientCondition object definition 1200 requires satisfaction of all of the conditions of all the principals referenced by the 'sufficient principals' field 1203 of a Principal object definition 1000. Other embodiments can activate the Principal object definition 1000 without further authentication if a sufficient group of principals referenced by the 'sufficient principals' field 1203 are already enabled in the actor context.

As previously discussed, principals can be delegated. Delegation enables a delegated-to actor to perform actions in lieu of the delegated-by actor—but with limited rights. The delegated-by actor creates a delegated principal to represent the delegated-to actor and specifies the rights available to the delegated principal. For the delegated-to actor to perform a delegated operation the delegated-to actor must first activate the delegated principal and then perform the delegated operation. The privileges of the delegated principal determine what operations and on what computerized artifact the delegated-to actor can perform.

FIG. 13 illustrates one embodiment of a DelegatedPrincipal object definition 1300 where the DelegatedPrincipal object definition 1300 is an extension of the Principal object definition 1000 discussed with respect to FIG. 10. The DelegatedPrincipal object definition 1300 further includes a 'delegated-to' field 1301 and a 'delegated roles' field 1303. In one embodiment, the 'actor' field 1001 (from the inherited Principal object definition 1000) can reference the actor who owns the delegated principal while the 'delegated-to' field 1301 can reference the activating actor who can activate the delegated principal in lieu of the owner. The activating actor can be referenced by the 'delegated-to' field 1301.

For example, when the activating actor sends a message in lieu of the delegated-by actor, the activating actor is referenced by the 'delegated-to' field 1301 that was provided by the delegated-by actor. In some embodiments the system will maintain information that indicates that the activating actor performed the operation and that the delegated-by actor is the actor responsible for the operation. For example, the delegated-by actor is marked as the sender of message.

FIG. 14 illustrates a DelegatedRole object definition 1400 referenced by the 'delegated roles' field 1303 of FIG. 13 that includes a 'description' field 1401, a 'parent' field 1403, a 'delegated scope' field 1405, and a 'privileges' field 1407. The 'description' field 1401 can contain or reference a textual description of the Role. The 'parent' field 1403 references the DelegatedPrincipal object definition 1300. The 'delegated scope' field 1405 can reference the Scope of the Role and the 'privileges' field 1407 can reference which of the delegated-by actor's privileges have been delegated.

FIG. 15 illustrates a UserContext object definition 1500 that includes an 'active principal' field 1501 and an 'enabled principals' field 1503. The 'active principal' field 1501 references the actor's currently active principal (such as the principal resulting from the 'actor authentication' procedure 410). The 'enabled principals' field 1503 references the set of principals that are currently enabled for the actor.

The 'active principal' field 1501 and the 'enabled principals' field 1503 references can simplify actor authentication by using state referenced from the 'enabled principals' field 1503 to assist in the authentication of another principal. For example, assume principal B has the necessary conditions:

```
<{Password}
{Intranet | Extranet(VPN)}
{NativeClient | WebClient}
{Protocol}>,
``` has been previously activated, and is obtainable through the 'enabled principals' field 1503. Furthermore assume that principal A has the necessary conditions:

```
<{Password & Certificate}
{Intranet | Extranet(VPN)}
{NativeClient | WebClient}
{Protocol}>.
```

Note that some of the necessary conditions for principal A have already been satisfied by the necessary conditions of principal B reference by the 'enabled principals' field 1503. To activate principal A, the authentication service need only initiate the Certificate-based authentication to activate principal A and can use the {Password}, {Network}, {Client}, and {Protocol} information from principal B to satisfy the other necessary conditions for the principal.

The IDL subclass relations in FIG. 5B and FIG. 7 can be used in the following example OCL-like notations (one skilled in the art will understand the Object Constraint Language (OCL)) that describe the notion of a characteristic satisfying another characteristic:

```
Context Characteristic::satisfies(
    aCharacteristic : Characteristic) : boolean
    body: aCharacteristic ::= self.
```

In the above notations, "sel" is a characteristic and "aCharacteristic::=self" means that "aCharacteristic" is a superclass of "self". For example, if "self" is TLS then "self" satisfies Confidentiality because Confidentiality::=TLS.

The example OCL-like notations of FIGS. 16A-G provide additional detail to one skilled in the art. FIG. 16A describes the notion of a set of characteristics satisfying a characteristic. In FIG. 16A, "self" is a set of characteristics, for example, {Digest, SmartCard, TLS}. This set of characteristics satisfies a characteristic Confidentiality because Confidentiality::=TLS.

FIG. 16B describes the notion of a characteristic satisfying a set of characteristics. In FIG. 16B, "self" is a characteristic, which can be an expression, for example Digest & SmartCard & TLS. This expression satisfies a set of characteristics {Password, Confidentiality, Integrity, Nonrepudiation}. This is so because Password::=Digest, Confidentiality::=TLS, Integrity::=TLS, and Nonrepudiation::=SmartCard.

FIG. 16C describes the notion of a Network satisfying another Network. In FIG. 16C, "self" is a Network, which is a 3-tuple, for example (TLS, S/MIME, Wireless). This 3-tuple satisfies another Network (Confidentiality, Integrity, Wireless). This is so because TLS satisfies Confidentiality and S/MIME satisfies Integrity.

FIG. 16D describes the notion of a Network satisfying a Protection. In FIG. 16D "self" is a Network, which is a 3-tuple, for example (TLS, S/MIME, Wireless). This 3-tuple satisfies Confidentiality Protection. This is so because TLS satisfies Confidentiality.

FIG. 16E describes the notion of a set of Networks satisfying a Protection. In FIG. 16E, "self" is a set of Networks, which is a set of 3-tuples, for example {(TLS, TLS, Cable), (TLS, TLS, Wireless)}. Nether of these two networks satisfies TLS-SASL Protection.

FIG. 16F describes the notion of a NecessaryCondition satisfying a ProtectionLevel. In FIG. 16F, "self" is a NecessaryCondition, which is a 4-tuple, for example ({Password}, {(TLS, TLS, Wireless)}, {NativeClient}, {CMS}). This 4-tuple satisfies a ProtectionLevel defined by the 3-tuple {Authentication, Confidentiality, Integrity} because Password satisfies Authentication, TLS satisfies Confidentiality and Integrity.

FIG. 16G describe how a NecessaryConditions is satisfied by an Environment. In FIG. 16G, "self" is a NecessaryCondition, which is a 4-tuple, for example ({Password}, {(Confidentiality, Integrity, Wireless)}, {NativeClient}, {CMS}). This 4-tuple is satisfied by an Environment((TLS, S/MIME, Wireless), NativeClient, CMS). This is so because (TLS, S/MIME, Wireless) satisfies (Confidentiality, Integrity, Wireless), NativeClient satisfies {NativeClient}, and CMS satisfies {CMS}.

Figure 17:
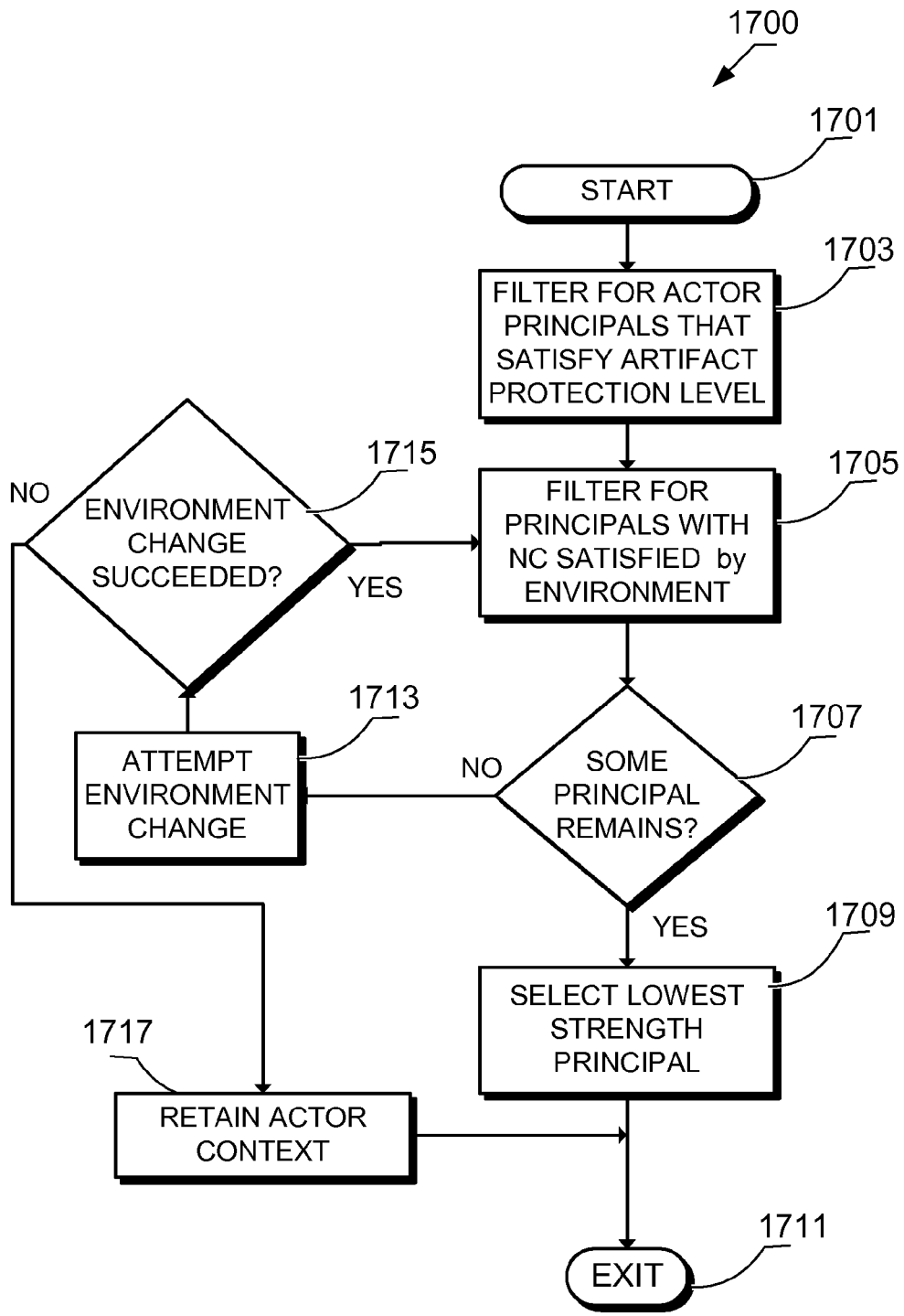
FIG. 17 illustrates a principal selection process that can be used in an embodiment.

FIG. 17 illustrates a principal selection process 1700 that can be used to select a principal to be used for authorization of the actor's requested operation on the computerized artifact. The principal selection process 1700 can be invoked by the 'principal selection' procedure 409 of FIG. 4, initiates at a start terminal 1701, and continues to a 'filter principals with respect to protection level' procedure 1703. The 'filter principals with respect to protection level' procedure 1703 selects principals from the actor's list of available principals (that is, referenced by the 'principals' field 803 and the 'delegated principals' field 805) having the 'necessary conditions' field 1003 referencing characteristics that satisfy the assigned protection level of the computerized artifact. Once the principals are selected that satisfy the protection level of the computerized artifact, a 'filter principals with respect to environment' procedure 1705 further filters the available principals leaving a set of candidate principals that contains only the principals having necessary conditions that satisfy the assigned protection level of the computerized artifact and that are also satisfied by the characteristics of the access environment. After filtering out principals that do not meet the requirements, a 'remaining principal' decision procedure 1707 determines whether at least one principal remains. If one or more principals remain, the principal selection process 1700 continues to a 'select principal' procedure 1709 that selects one of the remaining principals for use when attempting the authorization of the operation on the computerized artifact. The principal selection process 1700 completes through an 'exit' terminal 1711.

However, if the 'remaining principal' decision procedure 1707 determines that no principals have remained after the operation of the 'filter principals with respect to protection level' procedure 1703 and the 'filter principals with respect to environment' procedure 1705, the principal selection process 1700 continues to a 'change environment' procedure 1713 that provides the actor with an opportunity to adjust the access environment if possible (for example, by changing the actor's access environment) in order to satisfy the necessary condition of the principals that match the assigned protection level of the computerized artifact. A 'change succeeded' decision procedure 1715 determines whether the re-authentication should be attempted. If the adjusted access environment permits re-authentication the principal selection process 1700 continues back to the 'filter principals with respect to environment' procedure 1705 to re-filter the principals returned by the 'filter principals with respect to protection level' procedure 1703 and processing continues as previously described.

However, if the 'change succeeded' decision procedure 1715 determines that the access environment was not changed by the 'change environment' procedure 1713, the principal selection process 1700 continues to a 'retain actor context' procedure 1717 that retains the actor context and the principal selection process 1700 completes through the 'exit' terminal 1711. The authorization policy enforcement process will subsequently detect and handle the error if such should occur.

In some embodiments, the 'select principal' procedure 1709 selects the weakest of the available principals to resolve the conflicts when there are multiple principals that simultaneously satisfy the assigned protection level of the computerized artifact and that are satisfied by the characteristics of the access environment. These embodiments uphold the principle of least privileges.

Due to the graduated authentication scheme, the stronger principal can be activated more seamlessly when some of its necessary conditions have already been satisfied by the weaker principals in the actor context. One skilled in the art will understand that the technology disclosed herein ensures that the authorization service used to authorize the operation on the computerized artifact need not expose the Access Control List of the computerized artifact or Role Assignments. Thus, the ACL of the requested artifact and Roles remain confidential.

The system administrator or user can specify the protection level as part of the sensitivity and attach the sensitivity to any artifact in the workspace.

One skilled in the art will understand that the processes presented in FIG. 4 and FIG. 17 are but one of the many possible ways to illustrate or implement the technology described herein and each of these many possible ways and their equivalents are covered by the claims herein. For example, one skilled in the art will understand that there are many ways of sequencing the steps of filtering in FIG. 17 such as combining them, applying them in a different order etc. Furthermore, the disclosed Object definitions, attributes and characteristics can be defined in many equivalent ways and these ways and equivalents also are covered by the claims herein. One skilled in the art will also understand that there are other ways of defining the subclass relations among the characteristics of figures FIG. 5B and FIG. 7 as well as the other figures, and these alternative ways and equivalents are also covered by the claims herein.

One skilled in the art will understand that the disclosed technology can apply to any computerized artifact whether or not that computerized artifact contains, references, or is otherwise related to sensitive digitally-encoded information. Such a one will also understand that information related to any of the attributes is not limited and that, for example, the information can be contained in the object, be obtained through an object reference, can be obtained by some method or other programmed procedure related or not to any object.

As used herein, a procedure is a self-consistent sequence of steps that can be performed by logic implemented by a programmed computer, specialized electronics or other circuitry or a combination thereof that lead to a desired result. These steps can be defined by one or more computer instructions. These steps can be performed by a computer executing the instructions that define the steps. Further, these steps can be performed by circuitry designed to perform the steps. Thus, the term "procedure" can refer (for example, but without limitation) to a sequence of instructions, a sequence of instructions organized within a programmed-procedure or programmed-function, a sequence of instructions organized within programmed-processes executing in one or more computers, or a sequence of steps performed by electronic or other circuitry, or any logic or combination of the foregoing. In particular, such a one will understand that such logics includes logics such as a comparison logic, a deny logic, and a detection logic, as well as the other logics used in the claims.

One skilled in the art will understand that the network carries information (such as informational data as well as data that defines a computer program). The information can also be propagated using a carrier-wave. Signals capable of propagating the information includes electromagnetic signals, visible or invisible light pulses, signals on a data bus, or signals propagated over any wire, wireless, or optical fiber technology that allows information to be transmitted over a network. Programs and data are commonly read from both tangible physical media (such as a compact, floppy, or magnetic disk) and from a network. Thus, the network, like a tangible physical media, is a computer-usable data carrier.

From the foregoing, it will be appreciated that the technology has (without limitation) the following advantages:
 1) The disclosed technology provides a highly flexible entity-specific policy to protect computerized artifacts from unauthorized operations and where the access is responsive to the assigned protection level, the actor context, and the access environment.
2) The ability to adapt to different collaboration modes from different clients having different characteristics and through different secondary channels.
3) The ability to allow diverse populations of users to access and share the enterprise data protected by various levels of security.
4) The ability to automatically perform client device authentication using identity brokering services provided by wireless operators, instant messaging providers, and other network partners.
5) The ability to defer strong authentication until an attempted operation on a computerized artifact requires the stronger authentication.
6) The ability to select a principal that is commensurate with the protection level of the computerized artifact and the access environment.
7) The ability for Administrators and Users to select the appropriate protections for a computerized artifact.
8) The ability for a user to specify fine grained control on the access types to a computerized artifact for an individual principal as well as the ability to specify coarse grained control on the access types for all principals with the necessary security characteristics.
9) The ability for users to define the partial orderings of the principals based on the strength of the necessary conditions required to activate the principals.
10) The ability to protect the confidentiality of the access control list for a computerized artifact and Role assignments.
11) The ability to support negative privileges in a Role-Based-Access-Control-like access model.
12) The ability for users to define the graduated authentication policies essential for protecting the sensitive contents in open collaborative environments.
13) The ability to use a common model (comprising protocol adapters, authentication, authorization, client-management, subscription, and notification services) to support multi-channel and multi-modal interactions among actors and computerized artifacts in a collaboration environment without compromising the security requirements.
14) The ability to determine the actor's principal that satisfies the protection level of the computerized artifact and then guide or suggest to the user and the device management service to dynamically adjust the characteristics of the access environment in order to activate the selected principal. This is done without compromising the confidentiality of the ACL on the computerized artifact or role assignments.
15) The ability to impose constraints on the administration of the subjects in the access control lists, such that only actors and principals that have, respectively, protection level or necessary conditions stronger than or equal to the protection level of the computerized artifact can be assigned as the subject of an access type grant in the ACL. Similarly, the ability to impose constraints on the administration of the group member assignments, subgroup assignments, and role assignments such that only actors, subgroups, principals that have, respectively, protection level or necessary conditions stronger than or equal to the protection level of the group or role can be assigned to the group or role.
16) The ability to verify that the security characteristics of the principal satisfy the requirements of the security characteristics of the computerized artifact prior to attempting authorization of an operation on the computerized artifact enables a user to have fine grained control on the access types for an individual principal from all the principals that have matching security characteristics. This is more flexible than standard label security where the user can only specify access types for a specific set of security characteristics such that all principals having those security characteristics will have the same access types.
17) The ability to support negative privileges that propagate through the weaker principals.

One skilled in the art will understand that portions of the technology disclosed herein can be implemented using the Security Assertion Markup Language (SAML). Security Assertion Markup Language is a standard defined by OASIS for exchanging authentication and authorization data in XML format between one or more identity providers, which produces the Security Assertion Markup Language assertions, and one or more service providers, which consumes the Security Assertion Markup Language assertions. The authentication service provides the public listener endpoints that can be accessed from any clients, including rich web clients, native clients, mobile clients, web center clients, and web service clients to authenticate the users using any of the credentials, such as pins, passwords, Windows Native Authentication (WNA), X509 certificates, or biometrics. Through these listener endpoints, the authentication service serves as the Security Assertion Markup Language Identity Provider. The user contexts for the graduated authentication process can be included in the SAML assertion.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed follows:

1. A computer controlled method to protect a computerized artifact, said method comprising:
   determining, by a computer, an access environment for an attempted operation on a computerized artifact by an actor, wherein the actor is associated with a plurality of authentication principals, and wherein each authentication principal is associated with a set of necessary conditions for activating the authentication principal, and a set of access privileges;
   selecting, from the plurality of authentication principals associated with the actor, a filtered set of authentication principals whose access privileges satisfy an authorization policy assigned to the computerized artifact, and whose necessary conditions are satisfied by the access environment;
   selecting, from the filtered set of authentication principals, one authentication principal whose necessary conditions are associated with a lowest authentication strength among the filtered set; and authenticating the actor and activating the selected authentication principal.

2. The computer controlled method of claim 1, wherein said attempted operation is directed to said computerized artifact; and wherein the method further comprises:

detecting said attempted operation in an actor context of the actor; and authorizing said attempted operation responsive to the access environment satisfying said necessary condition.

3. The computer controlled method of claim 2, further comprising:

detecting a change in said access environment;

activating a different authentication principal responsive to said change in said access environment; and attempting authorization of a second attempted operation responsive to said different authentication principal.

4. The computer controlled method of claim 1, further comprising:

determining a characteristic of said access environment that does not satisfy said necessary conditions; and changing said access environment to satisfy said necessary conditions.

5. The computer controlled method of claim 1, further comprising:

determining a sufficiency condition; and activating a different authentication principal.

6. The computer controlled method of claim 1, further comprising:

determining a sufficiency condition;

evaluating, responsive to said sufficiency condition, whether a sufficient group of authentication principals have been enabled; and activating a different authentication principal if said sufficient group of authentication principals have been enabled.

7. The computer controlled method of claim 1, wherein said selected authentication principal is a delegated authentication principal.

8. The computer controlled method of claim 1, further comprising specifying an assigned protection level for said computerized artifact, wherein the assigned protection level indicates authentication characteristics to include or exclude during authentication.

9. The computer controlled method of claim 8, wherein the selected authentication principal is a member of one or more of a group and a role, and wherein the group or the role is associated with a second type of protection level.

10. The computer controlled method of claim 9, further comprising using the second type of protection level as a constraint for Access Control List (ACL) administration, which involves preventing assignment of a prohibited access type in response to the necessary conditions associated with member authentication principals of the group or the role not including a protection characteristic associated with the protected level for the computerized artifact.

11. The computer controlled method of claim 1, further comprising:

determining a relative strength ordering for a set of available authentication principals, said set containing a stronger authentication principal and a weaker authentication principal; and granting an access type granted to said weaker authentication principal to said stronger authentication principal.

12. The computer controlled method of claim 11, further comprising:

denying an access type denied to said stronger authentication principal to said weaker authentication principal.

13. The computer controlled method of claim 1, further comprising using a protected level as a constraint for Access Control List (ACL) administration, which involves preventing assignment of a prohibited access type in response to the necessary conditions associated with the selected authentication principal not including a protection characteristic associated with the protected level for the computerized artifact.

14. The computer controlled method of claim 13, wherein the selected authentication principal is a member of one or more of a group and a role.

15. The computer controlled method of claim 1, further comprising using protected level to facilitate Access Control List (ACL) administration by:

assigning a type of protection characteristic to a group or a role;

determining whether the necessary conditions associated with the selected authentication principal is stronger than or equal to the protection characteristic assigned to the group or the role; and responsive to the necessary conditions being stronger than or equal to the protection characteristic, assigning the selected authentication principal as a member of the group or role.

16. The computer controlled method of claim 15, wherein a respective group comprises a plurality of subgroups, wherein a second type of protection characteristic assigned to a respective subgroup is stronger than or equal to the second type of protection characteristic of the group.

17. An apparatus having a central processing unit (CPU) and a memory coupled to said CPU to protect a computerized artifact, said apparatus comprising:

a processor;

a memory;

a first determination logic that determines an access environment for an attempted operation on a computerized artifact by an actor, wherein the actor is associated with a plurality of authentication principals, and wherein each authentication principal is associated with a set of necessary conditions for activating the authentication principal, and a set of access privileges;

a selection logic that:

selects, from the plurality of authentication principals associated with the actor, a filtered set of authentication principals whose access privileges satisfy an authorization policy assigned to the computerized artifact, and whose necessary conditions are satisfied by the access environment; and selects, from the filtered set of authentication principals, one authentication principal whose necessary conditions are associated with a lowest authentication strength among the filtered set; and an authentication logic that authenticates said actor and activate the selected authentication principal.

18. The apparatus of claim 17, said attempted operation is directed to said computerized artifact; and wherein the apparatus further comprises:

a first detection logic that detects said attempted operation in an actor context of the actor; and an authorization logic that authorizes said attempted operation on said computerized artifact responsive to the access environment satisfying said necessary conditions.

19. The apparatus of claim 18, further comprising:

a second detection logic that detects a change in said access environment wherein the authentication logic, responsive to the second detection logic, activates a different authentication principal and authenticates said actor for said different authentication principal and the authorization logic is configured to authorize a second attempted operation responsive to said different authentication principal.

20. The apparatus of claim 17, further comprising:
a second determination logic that determines a characteristic of said access environment that does not satisfy said necessary conditions; and
an environment change logic that, responsive to the second determination logic, changes said access environment to satisfy said necessary conditions.

21. The apparatus of claim 17, further comprising:
a second determination logic that determines a sufficiency condition, wherein the authentication logic, in response to the second determination logic, activates a different authentication principal.

22. The apparatus of claim 17, further comprising:
a second determination logic that determines a sufficiency condition;
an evaluation logic that evaluates, responsive to the second determination logic, whether a sufficient group of authentication principals have been enabled, wherein the authentication logic, in response to the evaluation logic, activates a different authentication principal.

23. The apparatus of claim 17, wherein said selected authentication principal is a delegated authentication principal.

24. The apparatus of claim 17, further comprising a specification logic that specifies an assigned protection level for said computerized artifact, wherein the assigned protection level indicates authentication characteristics to include or exclude during authentication.

25. The apparatus of claim 17, further comprising:
a second determination logic that determines a relative strength ordering for a set of available authentication principals, said set containing a stronger authentication principal and a weaker authentication principal; and
a grant logic that, responsive to the second determination logic, grants an access type granted to said weaker authentication principal to said stronger authentication principal.

26. The apparatus of claim 25, further comprising:
a deny logic that, responsive to the second determination logic, denies an access type denied to said stronger authentication principal to said weaker authentication principal.

27. A computer program product comprising to protect a computerized artifact, said product comprising:
a non-transitory computer-usable data carrier providing instructions that, when executed by a computer, cause said computer to perform a method comprising:
determining an access environment for an attempted operation on a computerized artifact by an actor, wherein the actor is associated with a plurality of authentication principals, and wherein each authentication principal is associated with a set of necessary conditions for activating the authentication principal, and a set of access privileges;
selecting, from the plurality of authentication principals associated with the actor, a filtered set of authentication principals whose access privileges satisfy an authorization policy assigned to the computerized artifact, and whose necessary conditions are satisfied by the access environment;
selecting, from the filtered set of authentication principals, one authentication principal whose necessary conditions are associated with a lowest authentication strength among the filtered set; and
authenticating the actor and activating the selected authentication principal.

28. The computer program product of claim 27, wherein said attempted operation is directed to said computerized artifact; and wherein the method further comprises:
detecting said attempted operation in an actor context of the actor; and
authorizing said attempted operation responsive to the access environment satisfying said necessary conditions.

29. The computer program product of claim 28, wherein the method further comprises:
detecting a change in said access environment;
activating a different authentication principal responsive to said change in said access environment; and
attempting authorization of a second attempted operation responsive to said different authentication principal.

30. The computer program product of claim 27, wherein the method further comprises:
determining a characteristic of said access environment that does not satisfy said necessary conditions and
changing said access environment to satisfy said necessary conditions.

31. The computer program product of claim 27, wherein the method further comprises:
determining a sufficiency condition;
evaluating, responsive to said sufficiency condition, whether a sufficient group of authentication principals have been enabled; and
activating a different authentication principal if said sufficient group of authentication principals have been enabled.

32. The computer program product of claim 27, wherein the method further comprises:
determining a relative strength ordering for a set of available authentication principals, said set containing a stronger authentication principal and a weaker authentication principal; and
granting an access type granted to said weaker authentication principal to said stronger authentication principal.

33. The computer program product of claim 32, wherein the method further comprises:
denying an access type denied to said stronger authentication principal to said weaker authentication principal.

* * * * *

UNITED STATES PATENT AND TRADEMARK OFFICE
CERTIFICATE OF CORRECTION

| | |
|---|---|
| PATENT NO. | : 8,650,616 B2 |
| APPLICATION NO. | : 11/959038 |
| DATED | : February 11, 2014 |
| INVENTOR(S) | : Chan et al. |

Page 1 of 1

It is certified that error appears in the above-identified patent and that said Letters Patent is hereby corrected as shown below:

In the Specification

In column 4, line 21, delete "certificates;" and insert -- certificates. --, therefor.

In column 4, line 67, delete ""containers"" and insert -- Containers --, therefor.

In column 6, line 57, delete "5A" and insert -- 5A. --, therefor.

In column 19, line 22, delete "then" and insert -- than --, therefor.

In column 22, line 47, delete "Nether" and insert -- Neither --, therefor.

Signed and Sealed this
First Day of July, 2014

Michelle K. Lee
*Deputy Director of the United States Patent and Trademark Office*